US012560621B2

(12) United States Patent
Navacchia et al.

(10) Patent No.: US 12,560,621 B2
(45) Date of Patent: Feb. 24, 2026

(54) INSPECTION DEVICE FOR THE QUALITY CONTROL OF ROD-SHAPED ARTICLES

(71) Applicant: PHILIP MORRIS PRODUCTS S.A., Neuchatel (CH)

(72) Inventors: Eugenio Navacchia, Bologna (IT); Ivano Montoleone, Pianoro (IT)

(73) Assignee: Philip Morris Products S.A., Neuchatel (CH)

( * ) Notice: Subject to any disclaimer, the term of this patent is extended or adjusted under 35 U.S.C. 154(b) by 487 days.

(21) Appl. No.: 18/032,970

(22) PCT Filed: Oct. 20, 2021

(86) PCT No.: PCT/EP2021/079117
§ 371 (c)(1),
(2) Date: Apr. 20, 2023

(87) PCT Pub. No.: WO2022/084404
PCT Pub. Date: Apr. 28, 2022

(65) Prior Publication Data
US 2023/0393160 A1     Dec. 7, 2023

(30) Foreign Application Priority Data
Oct. 21, 2020     (EP) .................................... 20203168

(51) Int. Cl.
*A24C 5/34*          (2006.01)
*A24C 5/01*          (2020.01)
(Continued)

(52) U.S. Cl.
CPC ......... *G01N 35/00613* (2013.01); *A24C 5/01* (2020.01); *A24C 5/323* (2013.01);
(Continued)

(58) Field of Classification Search
CPC ........... A24C 5/01; A24C 5/34; A24C 5/3412; A24C 5/345; G01N 27/82; G01N 35/00613
See application file for complete search history.

(56) References Cited

U.S. PATENT DOCUMENTS

2020/0196659 A1     6/2020   Sikora

FOREIGN PATENT DOCUMENTS

| DE | 102016115098 | 2/2018 |
| EP | 3698663 | 8/2020 |
| WO | WO 2019/106569 | 6/2019 |

OTHER PUBLICATIONS

PCT International Search Report and Written Opinion for PCT/EP2021/079117dated Jan. 13, 2022 (9 pages).

*Primary Examiner* — Eric Yaary
(74) *Attorney, Agent, or Firm* — Mueting Raasch Group

(57) ABSTRACT

The present invention relates to an inspection device for the quality control of rod-shaped articles, the device comprising: •a drum (4) defining an outer surface (13,40) and including a plurality of seats (41), each seat (41) of the plurality adapted to receive a rod-shaped article; •an inductive sensor (5) located at a seat (41) of the plurality, the inductive sensor (5) including a coil (51) defining an inner volume (50) large enough to receive therein an end of the rod-shaped article, the inductive sensor (5) being adapted to sense a characteristic of a susceptor (12) in the rod-shaped article; •wherein the coil (51) includes a first semi-coil and a second semi-coil, the first semi-coil and/or the second semi-coil being movable from a first operative position where the first semi-coil and the second semi-coil are in contact to each other forming the coil (51) where current can flow to a second operative position where the first semi-coil and the second semi-coil are separated from each other and no current can flow, and vice-versa; •the first semi-coil being (Continued)

located below the outer surface (13,40) of the drum (4) and the second semi-coil being located above the outer surface (13,40) of the drum (4); and •an actuator (6) adapted to move the first semi-coil and the second semi-coil from the first operative position to the second operative position and vice-versa.

20 Claims, 7 Drawing Sheets

(51) Int. Cl.
    *A24C 5/32*           (2006.01)
    *A24C 5/345*         (2006.01)
    *G01N 27/82*         (2006.01)
    *G01N 35/00*         (2006.01)
(52) U.S. Cl.
    CPC ............ *A24C 5/3412* (2013.01); *A24C 5/345* (2013.01); *G01N 27/82* (2013.01)

FIG.1
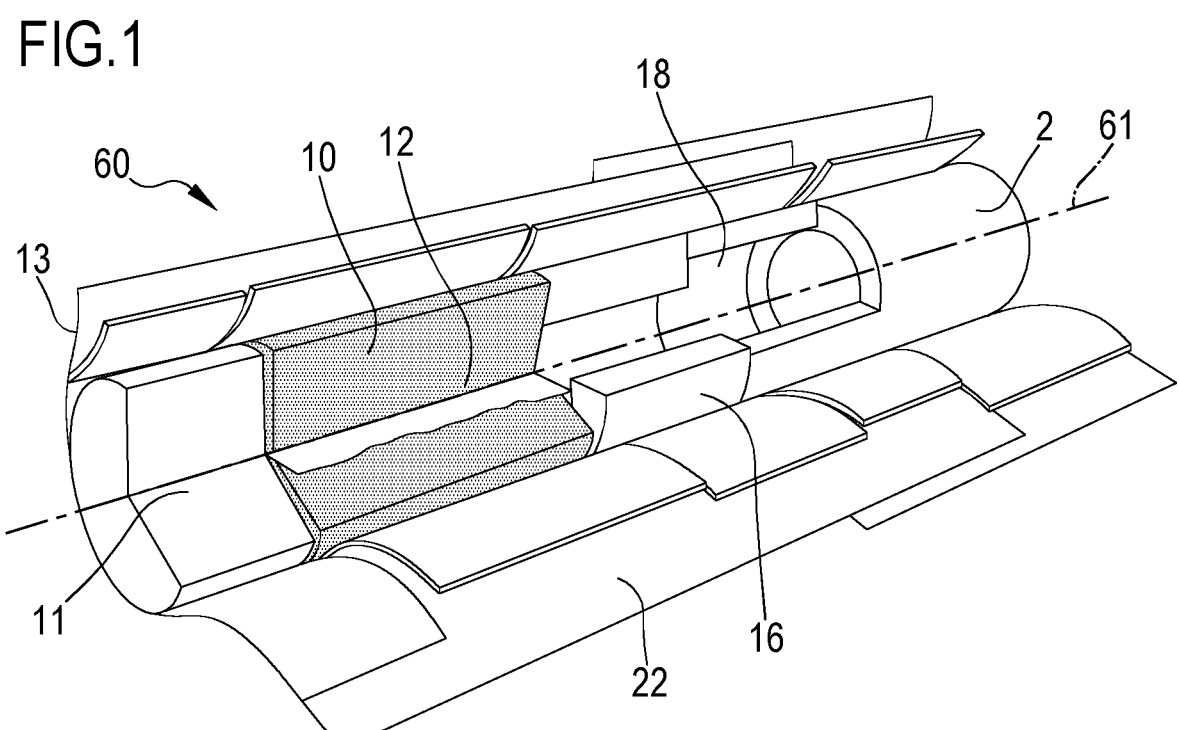
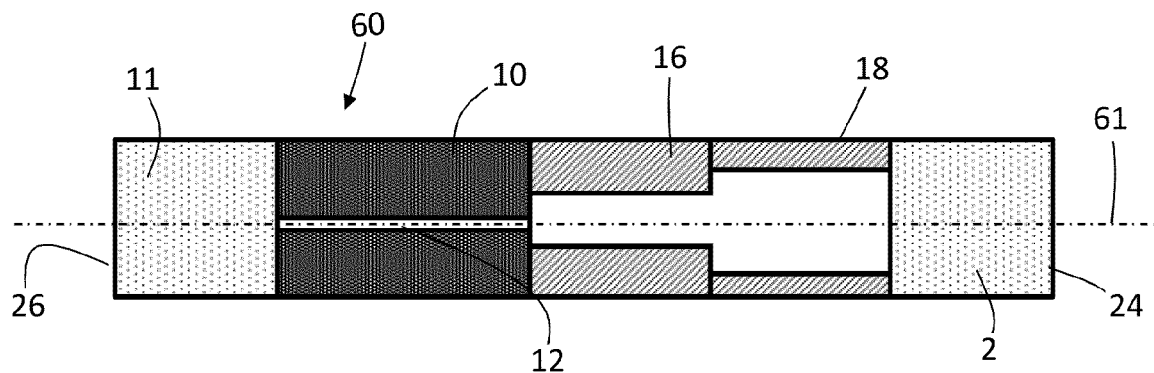
FIG.2

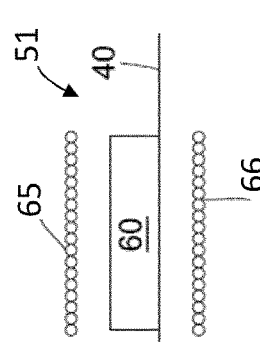
FIG.13
FIG.14
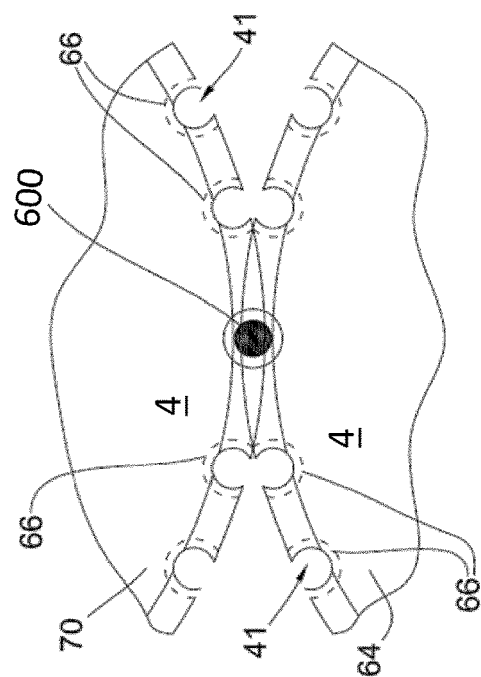
FIG.11
FIG.12
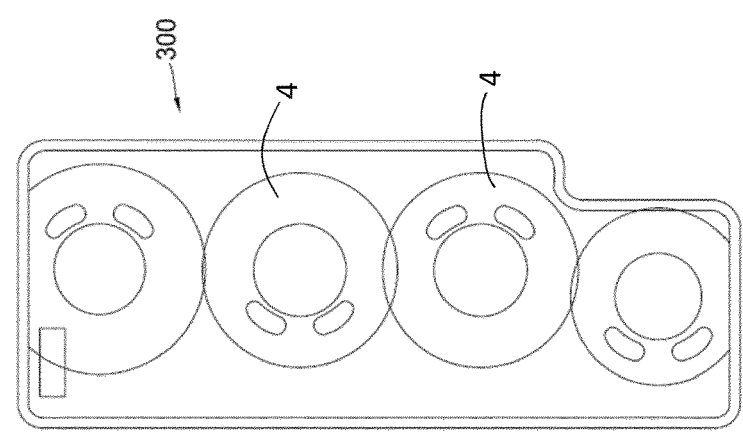
FIG.10

INSPECTION DEVICE FOR THE QUALITY CONTROL OF ROD-SHAPED ARTICLES

This application is a U.S. National Stage Application of International Application No. PCT/EP2021/079117 filed Oct. 20, 2021, which was published in English on Apr. 28, 2022, as International Publication No. WO 2022/084404 A1. International Application No. PCT/EP2021/079117 claims priority to European Application No. 20203168.8 filed Oct. 21, 2020.

The present invention relates to an inspection device for the quality control of rod-shaped articles, in particular aerosol generating articles where a conductive band capable of being induction heated is inserted inside an aerosol generating material, such as the susceptor of a tobacco segment.

Aerosol generating devices are known, which comprise an aerosol-forming substrate and an inductive heating device. The inductive heating device comprises an induction source which produces an alternating electromagnetic field which induces heat generating eddy currents and hysteresis losses in a susceptor. The susceptor is in thermal proximity of the aerosol-forming substrate, for example a tobacco substrate. The heated susceptor in turn heats the aerosol-forming substrate which comprises a material which is capable of releasing volatile compounds that can form an aerosol.

In some components, the susceptor is positioned inside a component of the aerosol generating article.

Because of manufacturing tolerances, it may occur that the susceptor in the component is not in the desired position, or it does not have the proper orientation. If the susceptor remains in the not correct position or orientation, a lack of product conformity in terms of deliveries of the aerosol when the component is used in an aerosol generating device may be obtained.

It is therefore desirable to detect such defects as early as possible to ensure that only compliant products are produced and that unnecessary costs and waste are avoided.

Furthermore, the components, including those containing the susceptors, are processed at high speed, such as 5000 components each minute. Thus, the time window in which such components can be checked to determine their compliance to the production requirements is relatively short. For example, when the components are positioned in the drum of a combiner, they have a high rotational speed, and a time window for a sensor to capture data necessary to evaluate the shape, position or presence or absence of the susceptor is of about 200 milliseconds.

It is thus desirable to detect the defects relating to the susceptors at a relatively high speed.

In a first aspect, the invention relates to an inspection device for the quality control of rod-shaped articles comprises a drum defining an outer surface and including a plurality of seats, each seat of the plurality adapted to receive a rod-shaped article. The inspection device preferably includes an inductive sensor positioned at a seat of the plurality, the inductive sensor including a coil defining an inner volume large enough to receive therein an end of the rod-shaped article, the inductive sensor being adapted to sense a characteristic of a susceptor in the rod-shaped article. Preferably, the coil includes a first semi-coil and a second semi-coil, the first semi-coil and the second semi-coil being movable from a first operative position where the first semi-coil and the second semi-coil are in contact to each other forming the coil where current can flow to a second operative position where the first semi-coil and the second semi-coil are separated from each other, and vice-versa.

According to another aspect of the invention, a rod-shaped article is provided. The rod-shaped article may be for example a component of an aerosol generating article. The component has preferably the shape of a rod. Preferably, the rod-shaped article defines a longitudinal axis. Preferably, the rod-shaped article defines a first end and a second end.

Preferably, a cross section of the rod-shaped article along a plane perpendicular to its longitudinal axis is a circle or an oval. However, the rod-shaped article may also have the cross-section of a rectangle or of a polygon. The rod-shaped article comprises an outer surface, preferably substantially cylindrical, which extends along the longitudinal axis. In case of substantially cylindrical rod-shaped articles, the longitudinal axis corresponds to the axis of the cylinder.

Preferably, the rod-shaped article includes an aerosol generating article, or a component of an aerosol generating article, or more than one component of an aerosol generating article. The component of the aerosol generating article may include an aerosol forming substrate. The aerosol forming substrate may include a homogenized tobacco material.

The rod-shaped article further comprises a susceptor. The susceptor is preferably in thermal contact with the aerosol forming substrate. The thermal contact is created in order to heat the aerosol forming substrate. Upon heating, the aerosol forming substrate releases aerosol. Preferably, the susceptor is surrounded by the aerosol forming substrate. Preferably, the susceptor is completely inserted in the component of the rod-shaped article, that is, the susceptor is not visible from the outside of the rod-shaped article. Preferably, the susceptor is surrounded in all directions by the aerosol forming substrate.

Preferably, the susceptor defines a longitudinal axis. Preferably, the susceptor is closer to the first end of the rod-shaped article than to the second end of the rod-shaped article. Given a plane perpendicular to the longitudinal axis and dividing the rod-shaped article in a first half including the first end and a second half including the second end, preferably the susceptor is predominantly in the first half. Preferably, the susceptor is located at or in proximity of the first end of the rod-shaped article. Preferably, the susceptor is completely inserted in a component of the rod-shaped article. Preferably, the susceptor extends from the first end to the second end of the component of the rod-shaped article. Preferably, the susceptor defines a longitudinal axis. Preferably, the susceptor is inserted in the rod-shaped article so that its longitudinal axis is parallel to the longitudinal axis of the rod-shaped article. Preferably, the longitudinal axis of the susceptor is parallel or forms an angle lower than 20 degrees with the longitudinal axis of the rod-shaped article. More preferably, the longitudinal axis of the susceptor and the longitudinal axis of the rod-shaped article are congruent.

The longitudinal axis of the susceptor may be a symmetry axis of the susceptor.

The susceptor is realized in a conductive material. Preferably, the susceptor is realized in metal. Preferably, the susceptor is realized in ferromagnetic material. Although the susceptor is realized in conductive material, it may be covered by other materials, solid, such a layer of a different material, or liquid, such as gel.

Preferably, the susceptor has the shape of a strip. Preferably its thickness is comprised between micrometres and 60 micrometres. Preferably, the length of the susceptor is comprised between 5 millimetres and 20 millimetres.

Preferably, the rod-shaped article is wrapped in a wrapping sheet.

The invention further includes providing a drum. The drum defines a drum rotational axis around which the drum is adapted to rotate. The drum can be mechanically driven, for example by a drum drive comprising a gear or a toothed belt. The drum may be driven by an electrical drum drive. The drum is preferably cylindrically shaped and comprises an outer surface. The outer surface is for example a substantially cylindrical surface having as a geometrical centre the drum rotational axis.

The drum is adapted to transport and rotate the rod-shaped article. Preferably, the drum is adapted to transport and rotate a plurality of rod-shaped articles. Preferably, the drum is adapted to transport and rotate N rod-shaped articles, where $5 < N < 100$, more preferably $20 < N < 50$. In some embodiments, the drum comprises 40 seats.

The drum comprises at least a seat. Preferably, the seat is formed on the outer surface of the drum. The drum is preferably adapted to hold the rod-shaped article during transport in the seat. For example, the drum is adapted to hold the rod-shaped article in the seat during a rotation of the drum around its rotational axis. The seat preferably extends longitudinally along a seat axis. The seat is adapted, as the drum rotates, to receive a rod-shaped article. Preferably, the rod-shaped article fits in the seat with its longitudinal axis parallel to the seat axis. Preferably, each seat is so configured that the rod-shaped article can be housed therein when the seat axis and the longitudinal axis of the rod-shaped article are parallel. More preferably, the seat axis and the longitudinal axis of the rod-shaped article are congruent. The seat is preferably adapted to house a single rod-shaped article.

Preferably, the seat axis is parallel to the rotational axis of the drum. So, when the rod-shaped article is positioned in the seat, the longitudinal axis of the rod-shaped article is preferably parallel to the rotational axis of the drum. Preferably, all seats are formed on the peripheral surface of the drum. More preferably, the seats are equally spaced apart about the outer surface of the drum.

Preferably, all seats present in the drum have the same geometrical shape. For example, each seat comprises a receiving surface adapted to contact the outer surface of the rod-shaped article. The receiving surface preferably comprises a portion of a recessed surface, for example a cylindrical surface. The receiving surface is a portion of the outer surface of the drum. The receiving surface may be a portion of a cylindrical surface having a diameter equal to or slightly bigger than the diameter of the rod-shaped article transported by the drum. The axis of the receiving surface defines the seat axis.

Preferably, the seat axis is parallel to the rotational axis of the drum, therefore when the rod-shaped articles are positioned in the seats of the drum, their longitudinal axes are parallel to the rotational axis of the drum.

Preferably, the drum also comprises a first side surface and a second side surface, located at the two opposite sides of the outer surface. Preferably, the seat extends from the first side surface to the opposite second side surface. The seat may reach the first side surface or the second side surface or both, so that the seat is "open" at the two ends. Alternatively, the seat ends do not reach the first side surface or the second side surface, and in this case the seat is a "closed" seat.

Each seat preferably includes a suction aperture, connected to a suction system or pneumatic system, adapted to hold the rod-shaped article in the seat by suction while the drum rotates. More than an aperture may be present, depending for example on the size and weight of the rod-shaped article.

At least a seat of the drum is associated with an inductive sensor. More preferably a plurality of seats of the drum, and even more preferably all seats of the drum, are associated with an inductive sensor. In the technical field, inductive sensor and induction sensor are synonyms. Inductive sensors use currents induced by magnetic fields to detect nearby conductive objects, such as metal objects. The inductive sensor comprises a coil, which is an inductor, to generate a magnetic field, such as a high frequency magnetic field. If there is conductive object, such as the susceptor embedded in the rod-shaped article, near the changing magnetic field, current will flow in the conductive object. This resulting current flow in the conductive object sets up a new magnetic field that opposes the original magnetic field formed by the current flowing in the coil. The net effect is that it changes the impedance, such for example the resistance, of the system "coil and susceptor" in the inductive sensor. By measuring the impedance or a parameter function of the impedance, the sensor can determine when a conductive material has been brought nearby the inductive sensor. The change in the impedance depends on the type of conductive material in which the object is made, on the distance between the object and the sensor and on the size and shape of the object.

The inductive sensor may be for example the Texas instrument integrated circuit LCD 1101. Preferably, the inductive sensor measures a resistance equivalent to the susceptor. The inductive sensor may measure the impedance and resonant frequency of the equivalent system "coil and susceptor" by regulating the oscillation amplitude in a closed-loop configuration at a constant level, while monitoring the energy dissipated by the resonator. By monitoring the amount of power injected into the resonator, the inductive sensor can determine the equivalent parallel resistance of the resonator, which it returns as a digital value.

Thus, an inductive sensor is associated with a seat of the drum, preferably a plurality of inductive sensor is associate with a plurality of seats of the drum, a sensor per drum, to detect a characteristic of the susceptor embedded in the rod-shaped article.

A characteristic of the susceptor may be the presence or the absence of the susceptor. A characteristic of the susceptor may be the length of the susceptor. The characteristic of the susceptor may be indicative of the nature or consistency of shape or composition of the susceptor.

More than a characteristic of the susceptor may be detected by the inductive sensor. The characteristics may also include a dimension of the susceptor, the mass of the material in which the susceptor is formed.

The characteristic of the susceptor to be measured preferably is measured by measuring a parameter function of the impedance of the coil, or of the system "coil and susceptor".

The parameter function of the impedance is preferably the impedance Z itself of the coil, or the equivalent resistance of the coil, or the inductance of the coil.

The inductive sensor includes a coil which defines an inner volume. The inner volume is delimited by the windings of the coil. For example, the inductive sensor includes a cylindrical coil comprising a plurality of windings of a wire. Preferably, the coil does not include a core, that is, the inner volume includes air. Preferably, the inner volume of the coil is large enough that the rod-shaped article can be inserted inside the coil, at least for a portion. The total length of the coil is preferably longer than the length of the susceptor. With length of the susceptor, in case a measurement of the length of the susceptor is desired, the nominal length of the susceptor is meant. For a proper insertion, the inner diameter of the coil is preferably wider than the diameter of the rod-shaped article. Preferably, the coil defines a longitudinal axis, called coil axis in the following.

Preferably, the rod-shaped article is inserted in the coil of the inductive sensor. The insertion can be complete, that is, the whole rod-shaped article is housed in the inner volume of the coil, or only partially, that is, only a portion of the rod-shaped article is housed in the inner volume of the coil. However, preferably, the rod-shaped article is inserted in the coil so that the whole susceptor is located within the inner volume of the coil at the end of the insertion.

Preferably, the coil of the inductive sensor is mounted at the seat of the drum in such a way that the coil axis and the seat axis are parallel to each other. This preferably in turn means that the coil axis and the longitudinal axis of the rod-shaped article, when present in the seat, are parallel as well.

The inductive sensor is used in order to measure characteristics of the susceptor inside the rod-shaped article. For this reason, the inspection device preferably includes a control unit. The control unit is preferably electrically connected to the inductive sensor. The control unit elaborates signals coming from the inductive sensor in order to evaluate a characteristic of the susceptor. The control unit may be a part of the inductive sensor.

In order to insert the rod-shaped article the in the inductive sensor, a relative movement between the rod-shaped article and the inductive sensor takes place.

Preferably, the insertion of the rod-shaped article into the coil takes place from the first end of the rod-shaped article. The susceptor is preferably closer to the first end than the second end, thus an insertion from the first end requires a shorter coil than an insertion from the second end in order for the susceptor to be completely inserted in the inner volume of the coil. In this way, only a limited portion of the rod-shaped article needs to enter into the coil to investigate a characteristic of the susceptor.

The coil comprises a first semi-coil and a second semi-coil. The first semi-coil and the second semi-coil are two portions of the coil sectioned along a plane parallel to the longitudinal axis of the coil. Therefore, the first semi-coil and the second semi-coil may have different sizes. More preferably, the first semi-coil and the second semi-coil are each a half of the coil when sectioned along a plane containing the longitudinal axis of the coil. Each semi-coil includes a plurality of half-windings. Each half winding is for example an arc of a circumference, more preferably half circumference. The arc of circumference of the first semi-coil and the corresponding arc of circumference of the second semi-coil forms a winding of the coil. The first semi-coil and the second semi-coil are movable one with respect to the other. The movement performed by the first semi-coil, or the second semi-coil, or both, is preferably a translation, that is, a linear movement. The first semi-coil and the second semi-coil may be in a first operative position in which the first semi-coil and the second semi-coil are in contact in such a way that a complete coil is formed and an electrical current can flow into the windings of the coil. In this first operative position, each of the half-windings of the first semi-coil correspond to a half winding of the second coil. Further, to each half winding of the second semi-coil, corresponds a half winding of the first semi-coil. In this first operative position, the contact between the first semi-coil and the second semi-coil is such that a current can flow in the coil formed by the two semi-coils. The inductive sensor can therefore detect a characteristic of the susceptor. Conductive strips may for example be formed on the outer surface of the drum, where the second semi-coil or the first semi-coil slides.

The first semi-coil and the second semi-coil may be in a second operative condition in which the first semi-coil and the second semi-coil are at a given distance from each other. In this second operative position, not all windings are complete, or no winding is complete. A "distance" between the first semi-coil and the second semi-coil is present. The presence of a distance between the first semi-coil and the second semi-coil means that at least a half-winding of the first semi-coil does not correspond to a half-winding of the second semi-coil. Preferably, in the second operative position, the two semi-coils are one subsequent to the other along the longitudinal axis of the coil, with a gap therebetween. If in the second operative position, some half-windings of the first semi-coil are in contact with some of the half-windings of the second semi-coil, current may flow in the few formed full windings, however in this configuration a measurement is not made. Alternatively, in the second operative position, current cannot flow in the coil. The flow of current depends on the type of electrical contact between the first semi-coil and second semi-coil.

The first semi-coil and the second semi-coil are movable from the first operative position to the second operative position and vice-versa.

When it is said that "the first semi-coil and the second semi-coil are movable from the first operative position to the second operative position", it means that only the first semi-coil may move, only the second semi-coil may move, or both first semi-coil and second semi-coil may move.

The movement of the first semi-coil and the second semi-coil may be the following. The first semi-coil may linearly move with respect to the second semi-coil. The second semi-coil is integral with outer surface of the drum, that is, the second semi-coil rotates with the outer surface, but it does not move with respect to the outer surface (that is, the second semi-coil is stationary with respect to the outer surface). Alternatively, the second semi-coil may linearly move with respect to the first semi-coil. The first semi-coil is stationary with respect to the outer surface of the drum, that is, the first semi-coil rotates with the outer surface, but it does not move with respect to the outer surface. Alternatively, both the first semi-coil and the second semi-coil move one with respect to the other. Each of the first semi-coil and second semi-coil may perform a reciprocating movement towards and away to the other of the first semi-coil and second semi-coil.

The first semi-coil is positioned below the outer surface of the drum. With the term "below" the surface, it is meant that the first semi-coil extends within the drum radially inwards. In order to form an electrical connection with the second semi-coil, terminal ends of the half-windings of the first semi-coil protrude from the outer surface of the drum, so that an electrical connection with the half-windings of the second semi-coil can be made. The ends of the half-windings of the first semi-coil preferably are substantially flush with the outer surface of the drum.

The second semi-coil preferably extends above the outer surface of the drum. The drum may for example include rails, for example a pair of rails for each seat, where the second semi-coil may run towards and away the first semi-coil.

The outer surface of the drum may also include conductive strips to allow the sliding of the second semi-coil towards and away the first semi-coil and at the same time assuring electrical connection between the two semi-coils.

The outer surface may include electric tracks on which the first semi-coil moves, so that, when the relative position of the first semi-coil and second semi-coil is such that the complete coil is formed (the first semi-coil and the second semi-coil are in the first operative position), the endings of the half-winding of the first semi-coil corresponding to the endings of the half windings of the second semi-coil, current can flow in the so formed windings due to the conductive track present in-between.

The first semi-coil, the second semi-coil or both are moved by an actuator. The actuator may be a linear actuator. Preferably, the movement is a linear movement in a direction parallel to the coil axis. Preferably, the movement is a linear movement parallel to the seat axis. The actuator may include for example a pneumatic actuator including a piston. The piston is fixed to the second semi-coil to move the same towards and away the first semi-coil. The actuator may include a rack and pinion mechanism.

In operation, the rod-shaped article is positioned in a seat of the drum where the detection of a characteristic of the susceptor by the inductive sensor is performed. The inductive sensor may measure a parameter function of the impedance of the coil. The measurement of the inductive sensor is preferably repeated, that is, several measurements of a characteristic of the susceptor are taken during the insertion of the rod-shaped article into the coil. Preferably, several measurement are also taken when the rod-shaped article is extracted from the coil. The positioning into the seat of the rod-shaped article may be due for example to a transfer from another drum or from a conveyor. Preferably, at the moment of the transfer into the seat of the rod-shaped article, the first semi-coil and the second semi-coil are in the second operative position, so that positioning of the rod-shaped article in the seat is possible. For example, the positioning is such that the rod-shaped article is located above, at least partially, the first semi-coil.

When the rod-shaped article is seated in the seat, the first semi-coil and the second semi-coil are moved by the actuator to the first operative position, so that a coil is formed. When the first semi-coil and the second semi-coil are moved in the first operative position, the second semi-coil slides above the rod-shaped article, embracing a portion of the rod-shaped article.

In the coil, current is made to flow in the whole length of the coil and the detection of a characteristic of the susceptor can take place. The detection made by the inductive sensor may be relating to the presence or absence of the susceptor. If the susceptor is not present, no Eddy current are created and there is no change in the magnetic field formed by the coil. Furthermore, the measurement made by the inductive sensor may relate to the size of the susceptor. The signal outputted by the inductive sensor depends on the material, size, shape and distance of the susceptor. Being the material known, and the distance measurable, the size or shape of the susceptor can be measured. Knowing the size, such as by knowing the weight, the dimensions of the susceptor may be obtained, for example from a minimum or maximum of the signal relative to the impedance of the system "coil and susceptor" measured by the inductive sensor. Indeed, the impedance of the "coil and susceptor" depends also on the characteristics of the susceptor.

No movement of the rod-shaped article, once is positioned on the seat of the drum, is thus required in order to obtain a characteristic of the susceptor. Measurement can be very fast due to the quick measurements possible with an inductive sensor. No complex mechanical parts are required in order to move the rod-shaped article. The rod-shaped article avoids deformations due to improper handling in the drum.

Preferably, the inspection device includes a control unit. Preferably, the control unit is in communication with the inductive sensor. Preferably, the inductive sensor is adapted to generate one or more signals relative to characteristics of the susceptor which are sent to the control unit.

Preferably, the inspection device includes a control unit adapted to command the actuator to move the first semi-coil, or the second semi-coil, or both from the second operative position to the first operative position when a rod-shaped article is on the seat. In order to place the rod-shaped article in the seat of the drum, the seat is preferably "free", that is, no other object should be positioned above the seat preventing the positioning of the rod-shaped article. The rod-shaped article may be transferred to the seat of the drum for example from another drum or from a conveyor. Therefore, preferably, when the rod-shaped article is positioned in the seat, the first semi-coil and the second semi-coil are in the second operative position, separated from each other, so that a volume above the seat is "free" and the rod-shaped article can be positioned in the seat without any obstacle. When the rod-shaped article is in the seat, the first semi-coil and the second semi-coil are moved to the first operative position and the detection of the characteristic of the susceptor can take place. The actuator thus moves the first semi-coil or the second semi-coil till the half-windings of the first semi-coil correspond to their complementary half-windings of the second semi-coil. The control unit commands the actuator to move the second semi-coil till the first operative position is reached. The command of the control unit may be triggered by a further sensor, which senses the presence or absence of the rod-shaped article in the seat. Thus, when the sensor senses the presence of the rod-shaped article, it sends a signal to the control unit which in turn sends a signal to the actuator to bring the first semi-coil and the second semi-coil in the first operative position and the detection by the inductive sensor may take place. Alternatively, the command sent by the control unit to the actuator is synchronized with the rotation of the drum. While the drum rotates, the control unit is adapted to receive or determine the drum angular speed and the point of insertion of the rod-shaped article in the drum. From this information, the control unit may calculate the angular position of each rod-shaped article in the drum. The control unit may command the actuators of the seats where an inductive sensor is present so that the first semi-coil and the second semi-coil move from the second operative position to the first operative position at a given frequency.

Preferably, the seat includes a receiving surface, part of the outer surface of the drum, and the first semi-coil is located below the receiving surface of the seat. Preferably, the first semi-coil is located under the receiving surface of the seat where the rod-shaped article is positioned. The second semi-coil is preferably moved from the first operative position where it is located above the seat to the second operative position where it is not above the seat. In the second operative position, the second semi-coil is shifted towards an end of the seat. For example, the second semi-coil is moved towards a side surface of the drum. Preferably, the movement of the second semi-coil is along a direction parallel to the seat axis.

According to another aspect, the invention relates to an inspection device for the quality control of rod-shaped articles, the device comprising: a drum including a plurality of seats, each seat of the plurality adapted to receive a rod-shaped article. The inspection device may include an inductive sensor located at a seat of the plurality, the inductive sensor including a coil defining an inner volume large enough to receive therein an end of the rod-shaped article, the inductive sensor being adapted to sense a characteristic of a susceptor in the rod-shaped article. The inspection device may include a compressed air system aligned with the seat of the plurality. The inspection device may include an actuator adapted to activate the compressed air system to blow air when the rod-shaped article is located in the seat to push the rod-shaped article inside the coil.

For example, the compressed air system may include a nozzle which is adapted to eject a flow of compressed air. The main direction of the flow of compressed air is preferably parallel to the longitudinal axis of the seat. Therefore, preferably, the flow of compressed air impinges on one of the ends of the rod-shaped article and pushes the same towards the coil. Preferably the coil is aligned with the seat, that is, the longitudinal axis of the coil is parallel or coincident to the longitudinal axis of the rod-shaped article. Preferably the longitudinal axis of the coil is parallel to the mean axis of the flow of compressed air.

Preferably, the compressed air system includes a second nozzle to eject a compressed air flow opposite to the first compressed air flow, to push the rod-shaped article outside the coil. Preferably, the second nozzle faces the first nozzle at a given distance. Preferably, the given distance is longer than the length of the rod-shaped article. Preferably, the first nozzle and the second nozzle are located at the opposite sides of the coil.

The size of the inner volume of the coil is such that the rod-shape article is insertable in the coil from one of its ends at least for a portion.

In this aspect, the drum and the rod-shaped article are as in the previous aspect and their characteristics are not repeated herewith. Furthermore, the characteristics to be measured of the susceptor are as described in the previous aspect.

In this aspect, the relative movement between the rod-shaped article and the inductive sensor comprises at least a movement of the rod-shaped article towards the coil of the inductive sensor. Preferably, the relative movement comprises only a movement of the rod-shaped article towards the coil of the inductive sensor. The coil of the inductive sensor is preferably fixed and moves together with the outer surface of the drum, that is, the coil is stationary with respect to the outer surface of the drum. Thus, the coil rotates together with the outer surface of the drum. Preferably, the rod-shaped article is positioned in the seat. After the seat positioning, the rod-shaped article is inserted into the coil of the inductive sensor by means of the compressed air flow.

The insertion of the rod-shaped article via the ejection of a flow of compressed air takes place when the rod-shaped article is positioned in the seat of the drum.

Preferably, the inspection includes a control unit. Preferably, the control unit is in communication with the inductive sensor. Preferably, the inductive sensor is adapted to generate one or more signals relative to characteristics of the susceptor. These characteristics may include: the presence or absence of a susceptor, a dimension of the susceptor, the mass of the material in which the susceptor is formed. Preferably, the control unit is in communication with the inductive sensor.

Preferably, the inductive sensor is adapted to emit a signal representative of a parameter function of the impedance of the coil.

Preferably, the inspection device includes a control unit adapted to command the compressed air system to eject the compressed air flow when a rod-shaped article is on the seat. The seat may be empty, when no rod-shaped article has been positioned in the seat. Alternatively, the seat may contain a rod-shaped article located therein. The compressed air system is preferably activated, that is, the compressed air flow is preferably ejected, when the rod-shaped article is located in the seat. In this way, the compressed air flow can push the rod-shaped article inside the coil of the inductive sensor. The rod-shaped article may be transferred to the seat of the drum for example from another drum or from a conveyor. When the rod-shaped article is in the seat, preferably, the control unit commands the compressed air system to eject the air flow. The command of the control unit may be triggered by a further sensor, which senses the presence or absence of the rod-shaped article in the seat. Thus, when the sensor senses the presence of the rod-shaped article, the sensor sends a signal to the control unit which in turn sends a signal to the compressed air system to eject the air flow to push the rod-shaped article into the coil. While the drum rotates, the control unit is adapted to receive or determine the drum angular speed and the point of insertion of the rod-shaped article in the drum. From this information, the control unit may calculate the angular position of each rod-shaped article in the drum. The control unit may command the compressed air system at a given frequency so that it ejects an air flow in a seat only when the seat is occupied by a rod-shaped article.

A single compressed air system for all seats of the plurality may be present. The compressed air system may be located at a side of the outer surface of the drum. The compressed air system preferably faces the first side surface or the second side surface of the drum. The compressed air system may be stationary, that is, it does not rotate with the drum. The compressed air system may eject a flow of compressed air to a single seat each time interval. However, the compressed air system may eject a flow of compressed air into several seats of the plurality while they pass in front of the nozzle of the compressed air system. The nozzle is stationary while the seats move in front of the nozzle due to the rotation of the drum. Each time a new seat is present in front of the nozzle, a new flow of air is preferably ejected.

Preferably, in any aspect, the drum has a rotational axis and each seat of the plurality defines a seat axis, the seat axis and the rotational axis being parallel to each other. Preferably, all seats have their seat axis parallel to the rotational axis of the drum. Preferably, all seat axes are parallel to each other. This in turn may mean that, when the rod-shaped articles are located in the seats, the longitudinal axes of the rod-shaped articles are parallel to the rotational axis. In order to determine a characteristic of the susceptor, a relative movement between the rod-shaped article and the coil is needed (for example, either a semi-coil moves or the rod-shaped article moves or both). The configuration where the rod-shaped articles are parallel to the rotational axis of the drum maximises the number of rod-shaped articles which the drum may host at the same time.

In a preferred embodiment of the invention, the length of the coil is comprised between 20 millimetres and 40 millimetres. Preferably, the length of the coil is longer than the length of the susceptor so that the whole susceptor can be inserted in the coil. The length of the coil is taken along the coil axis.

Preferably, the inspection device comprises a control unit electrically connected to the inductive sensor. Preferably, the control unit is adapted to receive a signal from the inductive sensor and to compare the signal with a threshold. The inductive sensor preferably measures a parameter function of the impedance of the system formed by coil and susceptor, or of the coil. In the susceptor, made of conductive material, Eddy currents are generated which is turn form a magnetic field. The parameter function of the impedance measured by the inductive sensor depends on the characteristics of the susceptor. In some embodiments of the inductive sensor, the inductive sensor measures a resistance. In particular, the inductive sensor is adapted to measure a series resistance equivalent to the susceptor. Preferably, the susceptor is considered acceptable if its resistance as measured by the inductive sensor is comprised between 200 milliOhm and 500 milliOhm. Due to the fact that the composition of the susceptor is known, the comparison with a threshold allows to determine characteristics of the susceptor.

No changes in the impedance of the coil are present if the susceptor is absent from the rod-shaped article, considering that no other conductive objects are generally included in the rod-shaped article besides the susceptor.

More preferably, the control unit is adapted to calculate a length of a susceptor located in the rod-shaped article. The susceptor length may be calculated by checking the variation of the signal emitted by the inductive sensor according to the position of the rod-shaped article in the coil. The signal emitted by the inductive sensor depends on the impedance of the system coil and susceptor. This impedance will reach a maximum (or a minimum) level when the whole susceptor has entered inside the coil, and will begin to decrease (or to increase) as soon as the end of the susceptor exits the coil. By comparing this signal to the positions of the rod-shaped article inside the coil, it is possible to determine the exact length of the susceptor.

Preferably, a rejection device is provided, which is adapted to reject rod-shaped articles on the basis of a signal emitted by the inductive sensor. If the inductive sensor senses that one of the characteristics of the susceptor inside the rod-shaped article is outside specifications, for example the susceptor is absent or its length is too short or too long, then the rod-shaped article is preferably not further processed. The rod-shaped article containing the "defective" susceptor is for example transferred to a rejection drum, different from the drum where rod-shaped articles containing a valid susceptor are transferred. Preferably, the control unit controls the suction system keeping the rod-shaped article in the seat in such a way that the rod-shaped articles containing defective susceptors are discharged from the seat differently than the rod-shaped article containing valid susceptors. The differentiation between the valid susceptor and defective susceptor is preferably made by the control unit. Preferably, the differentiation is based on the characteristic of the susceptor sensed by the inductive sensor.

It is preferred that the drum comprises a plurality of inductive sensors, an inductive sensor for each seat of the plurality of seats. In this way, a plurality of rod-shaped articles can be rapidly checked.

Preferably, the coil has a diameter comprised between 10 millimetres and 20 millimetres. The diameter of the coil herein considered is the inner diameter of the coil, that is, the available diameter for the insertion of the rod-shaped article. The size of the coil is such that the rod-shaped article can be inserted.

Preferably, the seat defines a seat axis and the coil defines a coil axis, the coil axis and the seat axis being preferably parallel to each other. In order to measure a characteristic of the susceptor, the rod-shaped article is inserted in the coil. If coil and rod-shaped article have their respective axes parallel to each other, the relative movement to be performed between coil and rod-shaped article is a simple linear movement. The mechanical construction is thus relatively simple.

According to another aspect, the invention relates to an inspection device comprising: a first drum including a first plurality of seats, each seat of the first plurality adapted to receive a rod-shaped article, the first drum defining a first outer surface. The inspection device may also comprise a first inductive sensor positioned at a seat of the first plurality, the first inductive sensor including a first coil defining an inner volume large enough to receive therein a first end of the rod-shaped article, the first inductive sensor being adapted to sense a characteristic of a first susceptor in the rod-shaped article. Preferably, the first coil includes a first semi-coil and a second semi-coil, the first semi-coil and the second semi-coil being movable from a first operative position where the first semi-coil and the second semi-coil are in contact to each other forming the first coil where current can flow to a second operative position where the first semi-coil and the second semi-coil are separated from each other, and vice-versa. Preferably, the first semi-coil is located below the first outer surface of the first drum and the second semi-coil being located above the first outer surface of the first drum. The inspection device may also comprise a first actuator adapted to move the first semi-coil and the second semi-coil of the first coil from the first operative position to the second operative position and vice-versa in the first drum. The inspection device may also comprise a second drum including a second plurality of seats, each seat of the second plurality being adapted to receive a rod-shaped article, the second drum defining a second outer surface. The inspection device may also comprise a second inductive sensor located at a seat of the second plurality, the second inductive sensor including a second coil defining an inner volume large enough to receive therein a second end of the rod-shaped article, the second inductive sensor being adapted to sense a characteristic of a second susceptor in the rod-shaped article. Preferably, the second coil includes a first semi-coil and a second semi-coil, the first semi-coil and the second semi-coil being movable from a first operative position where the first semi-coil and the second semi-coil are in contact to each other forming the second coil where current can flow to a second operative position where the first semi-coil and the second semi-coil are separated from each other, and vice-versa.

Preferably, the first semi-coil of the second coil is located below the second outer surface and the second semi-coil of the second coil is located above the second outer surface. The inspection device may also comprise a second actuator adapted to move the first semi-coil and the second semi-coil of the second coil from the first operative position to the second operative position and vice-versa in the second drum. Preferably, the first drum and the second drum are substantially tangent so as to allow a transfer of the rod-shaped article from the first drum to the second drum.

The inspection device substantially comprises two drums, the first drum and the second drum, each of the first drum and second drum being realized according to the first aspect of the invention above described. Two drums are used preferably when the rod-shaped article includes a first susceptor and a second susceptor. Preferably, the first susceptor and the second susceptor are located at the two opposite distal ends of the rod-shaped article. Thus, a first drum with a first inductive sensor is used to inspect the first end of the rod-shaped article where the first susceptor is present. A second drum with a second inductive sensor is used to inspect the second end of the rod-shaped article where the second susceptor is present. In the first drum the relative movement between the rod-shaped article and the coil is along a first axis, while the relative movement between the rod-shaped article and the coil in the second drum is along an axis parallel to the first axis, but with opposite direction. Preferably, after the inspection in the first drum where the first susceptor is inspected, the rod-shaped article is transferred to the second drum. Preferably, the transfer takes place only if the first susceptor is not defective. The transfer is made according to a standard method in the field. A fast complete check of both first susceptor and second susceptor is thus achieved.

According to a further aspect, the invention relates to an inspection device comprising: a first drum including a first plurality of seats, each seat of the first plurality adapted to receive a rod-shaped article. The inspection device preferably comprises a first inductive sensor located at a seat of the first plurality, the first inductive sensor including a first coil defining an inner volume large enough to receive therein a first end of the rod-shaped article, the first inductive sensor being adapted to sense a characteristic of a first susceptor in the rod-shaped article. The inspection device preferably comprises a first compressed air system aligned with the seat of the first plurality. The inspection device preferably comprises a first actuator adapted to activate the first compressed air system to blow air when the rod-shaped article is located in the seat of the first plurality and to push it inside the first coil of the first drum. The inspection device preferably comprises a second drum including a second plurality of seats, each seat of the second plurality adapted to receive a rod-shaped article. The inspection device preferably comprises a second inductive sensor positioned at a seat of the second plurality, the second inductive sensor including a second coil defining an inner volume large enough to receive therein a second end of the rod-shaped article, the second inductive sensor being adapted to sense a characteristic of a first susceptor in the rod-shaped article. The inspection device preferably comprises a second compressed air system aligned with the seat of the second plurality. The inspection device preferably comprises a second actuator adapted to activate the second compressed air system to blow air when the rod-shaped article is located in the seat of the second plurality and to push it inside the second coil of the second drum. Preferably, the first drum and the second drum are substantially tangent so as to allow a transfer of the rod-shaped article from the first drum to the second drum.

The inspection device substantially comprises two drums, the first drum and the second drum, each of the first drum and second drum being realized according to the second aspect of the invention above described. Two drums are used when the rod-shaped article includes a first susceptor and a second susceptor. Preferably, the first susceptor and the second susceptor are located at the two opposite distal ends of the rod-shaped article. Thus, a first drum with a first inductive sensor is used to inspect the first end of the rod-shaped article where the first susceptor is present. A second drum with a second inductive sensor is used to inspect the second end of the rod-shaped article where the second susceptor is present. Therefore, in the first drum the relative movement between the rod-shaped article and the coil is along a first axis, while the relative movement between the rod-shaped article and the coil in the second drum is along an axis parallel to the first axis, but with opposite direction. Preferably, after the inspection in the first drum, the rod-shaped article is transferred to the second drum. Preferably, the transfer takes place only if the first susceptor is not defective. The transfer is made according to a standard method in the field. A fast complete check of both first susceptor and second susceptor is thus achieved.

With "impedance" the complex-valued generalization of resistance is meant. The impedance Z is a complex number representing V (voltage)/I (current). In the case of an ideal inductor L, such as a coil, the impedance $Z_L$ is given by the formula:

$$Z_L = j\omega L$$

where j is the imaginary unit, $\omega$ the angular frequency of the exciting electric signal and L the inductance of the coil.

The equivalent resistance R of the coil, measured in Ohm, is then $\omega$ L.

In the following, the term "rod-shaped article" may refer to any element which may be included in an aerosol generating article or a complete aerosol generating article. Such elements are known in the art and not further detailed below. For example, such rod-shaped article might include a plug of a filter, a heat source, a tobacco rod, a charcoal element and so on. Preferably, the rod-shaped article is a plant material containing article, in particular a tobacco containing article. The tobacco article might contain a tobacco cut filler or an aerosol-forming reconstituted tobacco. The article may comprise a tobacco rod to be combusted or heated. Rod-shaped articles according to the invention may be whole, assembled aerosol generating articles or elements of aerosol generating articles that are combined with one or more other components in order to provide an assembled aerosol generating article for producing an aerosol, such as for example, the consumable part of a heated smoking device.

Preferably, the elements of the aerosol generating article comprises a tobacco-containing material including volatile tobacco flavour compounds, which are released from an aerosol generating substrate upon heating.

Preferably, the rod-shaped article may include a heat source, or a volatile flavour generating component, for example a menthol capsule, a charcoal element, or a susceptor.

Furthermore, the rod-shaped article may comprise a plurality of components of an aerosol generating article combined together, or even more than an aerosol generating article.

As used herein, the term "susceptor" refers to a material that is capable to convert electromagnetic energy into heat. When located in an alternating electromagnetic field, eddy currents are induced and hysteresis losses occur in the susceptor causing heating of the susceptor. As the susceptor is located in thermal contact or close thermal proximity with the aerosol forming substrate, the aerosol forming substrate is heated by the susceptor such that an aerosol is formed. Preferably, the susceptor is arranged in direct physical contact with the aerosol forming substrate, for example within the aerosol forming tobacco substrate.

The susceptor may be formed from any material that can be inductively heated to a temperature sufficient to generate an aerosol from the aerosol forming substrate. A preferred susceptor may comprise or consist of a ferromagnetic material, for example a ferromagnetic alloy, ferritic iron, or a ferromagnetic steel or stainless steel. A suitable susceptor may be, or comprise, aluminium. Preferred susceptors may be heated to a temperature in excess of 250 degrees Celsius. Suitable susceptors may comprise a non-metallic core with a metal layer disposed on the non-metallic core, for example metallic tracks formed on a surface of a ceramic core. A susceptor may have a protective external layer, for example a protective ceramic layer or protective glass layer encapsulating the susceptor. The susceptor may comprise a protective coating formed by a glass, a ceramic, or an inert metal, formed over a core of susceptor material.

The susceptor may be a multi-material susceptor and may comprise a first susceptor material and a second susceptor material. The first susceptor material is disposed in intimate physical contact with the second susceptor material. The second susceptor material preferably has a Curie temperature that is lower than 500° C. The first susceptor material is preferably used primarily to heat the susceptor when the susceptor is placed in a fluctuating electromagnetic field. Any suitable material may be used. For example, the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys.

Preferably, the susceptor has the form of a filament, rod, sheet or band. If the susceptor profile is of constant cross-section, for example a circular cross-section, it has a preferable width or diameter of between about 1 millimeter and about 5 millimeter. If the susceptor profile has the form of a sheet or band, the sheet or band preferably has a rectangular shape having a width preferably between about 2 millimeter and about 8 millimeter, more preferably, between about 3 millimeter and about 5 millimeter, for example 4 millimeter and a thickness preferably between about 0.03 millimeter and about 0.15 millimeter, more preferably between about 0.05 millimeter and about 0.09 millimeter, for example 0.07 millimeter.

Preferably, the rod-shaped article may have a length of between about 5 millimetres and about 20 millimetres, preferably between about 8 millimetres and about 16 millimetres for example of about 12 millimetres in length. In some cases, the rod-shape article may have a length of about 40 millimetres to about 85 millimetres.

In the following, the term "length", unless otherwise specified, refers to a length of the rod-shaped article along its longitudinal axis.

In the following, the term "rod-shaped" denotes a generally cylindrical element of substantially cylindrical, oval or elliptical cross-section. However, other prismatic forms with different cross sections are also possible.

As used herein, "aerosol generating article" is any article that generates an inhalable aerosol when an aerosol-forming substrate is heated. The term includes articles that comprise an aerosol-forming substrate that is heated by an external heat source, such as an electric heating element. An aerosol-forming article may be a non-combustible aerosol generating article, which is an article that releases volatile compounds without the combustion of the aerosol-forming substrate. An aerosol-forming article may be a heated aerosol generating article, which is an aerosol generating article comprising an aerosol-forming substrate that is intended to be heated rather than combusted in order to release volatile compounds that can form an aerosol. The term includes articles that comprise an aerosol-forming substrate and an integral heat source, for example a combustible heat source.

The aerosol generating article may comprise a mouthpiece element. The mouthpiece element may be located at the mouth end or downstream end of the aerosol generating article.

The aerosol generating article may comprise at least one filter element.

The filter segment may be a cellulose acetate filter plug made of cellulose acetate tow. A filter segment may have low particulate filtration efficiency or very low particulate filtration efficiency. A filter segment may be longitudinally spaced apart from the aerosol-forming substrate. The filter segment may have a length in the longitudinal direction of between about 5 millimetres and about 14 millimetres. The filter segment may have a length of about 7 millimetres.

The plurality of element of the aerosol-generating article may comprise at least one of a support element and an aerosol-cooling element.

Preferably, the aerosol-generating article comprises a wrapper wrapping the plurality of elements of the aerosol-generating article in the form of a rod. The wrapper may comprise at least one of a paper and a foil.

As used herein, the term "aerosol-forming substrate" denotes a substrate formed from or comprising an aerosol-forming material that is capable of releasing volatile compounds upon heating for generating an aerosol. The aerosol-forming substrate may contain a tobacco material or may contain a non-tobacco material or a combination of both, tobacco material and non-tobacco material. The aerosol forming substrate may be cellulose material impregnated with nicotine, preferably comprising one or more flavours. Advantageously, the aerosol-forming substrate comprises tobacco material, preferable homogenised tobacco material, preferably comprising one or more aerosol-formers. As used herein, the term 'homogenised tobacco material' denotes a material formed by agglomerating particulate tobacco.

Preferably, the aerosol-forming substrate contains volatile tobacco flavour compounds, which are released from the aerosol forming substrate upon heating. The aerosol-forming substrate may comprise or consist of blended tobacco cut filler or may comprise homogenised tobacco material.

Homogenised tobacco material may be formed by agglomerating particulate tobacco. The aerosol forming substrate may additionally comprise a non-tobacco-containing material, for example homogenised plant-based material other than tobacco.

Preferably, the aerosol-forming substrate is a tobacco sheet, preferably crimped, comprising tobacco material, fibers, binder and aerosol former. Preferably, the tobacco sheet is a cast leaf.

Cast leaf is a form of reconstituted tobacco that is formed from a slurry including tobacco particles, fiber particles, aerosol former, binder and for example also flavours.

Tobacco particles may be of the form of a tobacco dust having particles in the order of 30 micrometers to 250 micrometers, preferably in the order of 30 micrometers to 80 micrometers or 100 micrometers to 250 micrometers, depending on the desired sheet thickness and casting gap, where the casting gap typically defines the thickness of the sheet. The size of the tobacco particles refers to their Dv95 size in a volume distribution.

Fiber particles may also be included, which include tobacco stem materials, stalks or other tobacco plant material, and other cellulose-based fibers such as wood fibers having a low lignin content. Fiber particles may be selected based on the desire to produce a sufficient tensile strength for the cast leaf versus a low inclusion rate, for example, an inclusion rate between approximately 2 percent to 15 percent. Alternatively, fibers, such as vegetable fibers, may be used either with the above fiber particles or in the alternative, including hemp and bamboo.

Aerosol formers included in the slurry forming the cast leaf or used in other aerosol forming substrates may be chosen based on one or more characteristics. Functionally, the aerosol former provides a mechanism that allows it to be volatilized and convey nicotine or flavouring or both in an aerosol when heated above the specific volatilization temperature of the aerosol former. Different aerosol formers typically vaporize at different temperatures. The aerosol-former may be any suitable known compound or mixture of compounds that, in use, facilitates formation of a dense and stable aerosol and that is substantially resistant to thermal degradation at the operating temperature of an inductive heating device the inductively heatable tobacco substrate shall be used with. An aerosol former may be chosen based on its ability, for example, to remain stable at or around room temperature but able to volatize at a higher temperature, for example, between 40 degree Celsius and 450 degree Celsius.

The aerosol former may also have humectant type properties that help maintain a desirable level of moisture in an aerosol forming substrate when the substrate is composed of a tobacco-based product, particularly including tobacco particles. In particular, some aerosol formers are hygroscopic material that functions as a humectant, that is, a material that helps keep a tobacco substrate containing the humectant moist.

One or more aerosol former may be combined to take advantage of one or more properties of the combined aerosol formers. For example, triacetin may be combined with glycerin and water to take advantage of the triacetin's ability to convey active components and the humectant properties of the glycerin.

Aerosol formers may be selected from the polyols, glycol ethers, polyol ester, esters, and fatty acids and may comprise one or more of the following compounds: glycerin, erythritol, 1,3-butylene glycol, tetraethylene glycol, triethylene glycol, triethyl citrate, propylene carbonate, ethyl laurate, triacetin, meso-Erythritol, a diacetin mixture, a diethyl suberate, triethyl citrate, benzyl benzoate, benzyl phenyl acetate, ethyl vanillate, tributyrin, lauryl acetate, lauric acid, myristic acid, and propylene glycol.

The aerosol-forming substrate may comprise other additives and ingredients, such as flavourants. The aerosol forming substrate preferably comprises nicotine and at least one aerosol-former.

Aerosol generating articles according to the present invention may be in the form of filter combustible cigarettes or other smoking articles in which tobacco material is combusted to form smoke.

Preferably, the aerosol generating article may be substantially cylindrical in shape. The aerosol generating article may be substantially elongated. The aerosol generating article may have a length and a circumference substantially perpendicular to the length. The aerosol generating article may have a total length between about 30 millimetres and about 100 millimetres. The aerosol generating article may have an external diameter between about 5 millimetres and about 12 millimetres.

The invention is defined in the claims. However, below there is provided a non-exhaustive list of non-limiting examples. Any one or more of the features of these examples may be combined with any one or more features of another example, embodiment, or aspect described herein.

Example Ex1: An inspection device for the quality control of rod-shaped articles, the device comprising:

a drum including a plurality of seats, each seat of the plurality adapted to receive a rod-shaped article, the drum defining an outer surface;

an inductive sensor located at a seat of the plurality, the inductive sensor including a coil defining an inner volume large enough to receive therein an end of the rod-shaped article, the inductive sensor being adapted to sense a characteristic of a susceptor in the rod-shaped article;

wherein the coil includes a first semi-coil and a second semi-coil, the first semi-coil and the second semi-coil being movable from a first operative position where the first semi-coil and the second semi-coil are in contact to each other forming the coil where current can flow to a second operative position where the first semi-coil and the second semi-coil are separated from each other, and vice-versa;

the first semi-coil being located below the outer surface of the drum and the second semi-coil being located above the outer surface of the drum; and an actuator adapted to move the first semi-coil and the second semi-coil from the first operative position to the second operative position and vice-versa.

Example Ex2: The inspection device according to Ex1, including a control unit adapted to command the actuator to move the first semi-coil or the second semi-coil from the second operative position to the first operative position when a rod-shaped article is on the seat.

Example Ex3: The inspection device according to Ex1 or Ex2, wherein seat includes a receiving surface, part of the outer surface of the drum, and wherein the first semi-coil is located below the receiving surface of the seat.

Example Ex4: The inspection device according to one or more of Ex1-Ex3, wherein the outer surface of the drum includes one or more conductive strips to allow the sliding of the second semi-coil towards and away the first semi-coil and allowing electrical connection between the first semi-coil and the second semi-coil.

Example Ex5: The inspection device according to one or more of Ex1-Ex4, wherein the actuator includes a pneumatic actuator.

Example Ex6: The inspection device according to Ex5, wherein the pneumatic actuator includes a piston fixed to the second semi-coil.

Example Ex7: The inspection device according to one or more of Ex1-Ex6, wherein the coil defines a coil axis and wherein the movement of the first semi-coil and the second semi-coil from the first operative position to the second operative position and vice-versa is a linear movement.

Example Ex8: The inspection device according to Ex7, wherein the linear movement is a movement in a direction parallel to the coil axis.

Example Ex9: The inspection device according to Ex7 or Ex8, wherein the linear movement is a linear movement parallel to the seat axis.

Example Ex10: The inspection device according to one or more of Ex1-Ex9 including a control unit in communication with the inductive sensor, the control unit being adapted to receive signals from the inductive sensor relative to the characteristic of the susceptor.

Example Ex11: An inspection device for the quality control of rod-shaped articles, the device comprising:

a drum including a plurality of seats, each seat of the plurality adapted to receive a rod-shaped article;

an inductive sensor located at a seat of the plurality, the inductive sensor including a coil defining an inner volume large enough to receive therein an end of the rod-shaped article, the inductive sensor being adapted to sense a characteristic of a susceptor in the rod-shaped article;

a compressed air system aligned with the seat of the plurality;

an actuator adapted to activate the compressed air system to blow air when the rod-shaped article is located in the seat to push the rod-shaped article inside the coil.

Example Ex12: The inspection device according to Ex11, wherein the seat defines a seat axis and the compressed air system includes a nozzle adapted to eject a flow of compressed air substantially parallel to the seat axis.

Example Ex13: The inspection device according to one or more of Ex1-Ex12, wherein the drum has a rotational axis and each seat of the plurality defines a seat axis, the longitudinal axis and the seat axis being parallel to each other.

Example Ex14: The inspection device according to one or more of Ex1-Ex13, wherein the coil has a coil axis and each seat of the plurality defines a seat axis, the coil axis and the seat axis being parallel to each other.

Example Ex15: The inspection device according to one or more of Ex1-Ex14, wherein the length of the coil is comprised between 20 millimetres and 40 millimetres.

Example Ex16: The inspection device according to one or more of Ex1-Ex15, comprising a control unit electrically connected to the inductive sensor, the control unit being adapted to receive a signal from the inductive sensor and to compare the signal with a threshold.

Example Ex17: The inspection device according to one or more of Ex1-Ex16, wherein the characteristic of the susceptor is the length of the susceptor.

Example Ex18: The inspection device according to Ex16 or Ex17, wherein the control unit is adapted to calculate a length of a susceptor located in the rod-shaped article.

Example Ex19: The inspection device according to one or more of Ex1-Ex18, comprising a rejection device, adapted to reject rod-shaped articles on the basis of a signal emitted by the inductive sensor.

Example Ex20: The inspection device according to one or more of Ex1-Ex19, wherein the drum comprises a plurality of inductive sensors, a sensor for each seat of the plurality of seats.

Example Ex21: The inspection device according to one or more of Ex1-Ex20, wherein the coil has a diameter comprised between 10 millimetres and 20 millimetres.

Example Ex22: The inspection device according to one or more of Ex1-Ex21, wherein each seat of the plurality defines a seat axis the seat axes are parallel to each other.

Example Ex23: A kit comprising:

a rod-shaped article including a susceptor;

an inspection device according to one or more of Ex1-Ex22.

Example Ex24: The kit according to Ex23, wherein the rod-shaped article comprises a component of an aerosol generating article.

Example Ex25: The kit according to Ex23 or Ex24, wherein the susceptor is in contact with an aerosol forming material.

Example Ex26: The kit according to Ex25, wherein the aerosol forming material includes a tobacco material.

Example Ex27: An inspection device comprising:

a first drum including a first plurality of seats, each seat of the first plurality adapted to receive a rod-shaped article, the first drum defining a first outer surface;

a first inductive sensor positioned at a seat of the first plurality, the first inductive sensor including a first coil defining an inner volume large enough to receive therein a first end of the rod-shaped article, the first inductive sensor being adapted to sense a characteristic of a first susceptor in the rod-shaped article;

wherein the first coil includes a first semi-coil and a second semi-coil, the first semi-coil and the second semi-coil being movable from a first operative position where the first semi-coil and the second semi-coil are in contact to each other forming the first coil where current can flow to a second operative position where the first semi-coil and the second semi-coil are separated from each other, and vice-versa;

the first semi-coil being located below the first outer surface of the first drum and the second semi-coil being located above the first outer surface of the first drum;

a first actuator adapted to move the first semi-coil and the second semi-coil of the first coil from the first operative position to the second operative position and vice-versa in the first drum;

a second drum including a second plurality of seats, each seat of the second plurality being adapted to receive a rod-shaped article, the second drum defining a second outer surface;

a second inductive sensor located at a seat of the second plurality, the second inductive sensor including a second coil defining an inner volume large enough to receive therein a second end of the rod-shaped article, the second inductive sensor being adapted to sense a characteristic of a second susceptor in the rod-shaped article;

wherein the second coil includes a first semi-coil and a second semi-coil, the first semi-coil and the second semi-coil being movable from a first operative position where the first semi-coil and the second semi-coil are in contact to each other forming the second coil where current can flow to a second operative position where the first semi-coil and the second semi-coil are separated from each other and no current can flow, and vice-versa;

the first semi-coil of the second coil being located below the second outer surface and the second semi-coil of the second coil being located above the second outer surface;

a second actuator adapted to move the first semi-coil and the second semi-coil of the second coil from the first operative position to the second operative position and vice-versa in the second drum;

the first drum and the second drum being substantially tangent so as to allow a transfer of the rod-shaped article from the first drum to the second drum.

Example Ex29: An inspection device comprising:

a first drum including a first plurality of seats, each seat of the first plurality adapted to receive a rod-shaped article;

a first inductive sensor located at a seat of the first plurality, the first inductive sensor including a first coil defining an inner volume large enough to receive therein a first end of the rod-shaped article, the first inductive sensor being adapted to sense a characteristic of a first susceptor in the rod-shaped article;

a first compressed air system aligned with the seat of the first plurality;

a first actuator adapted to activate the first compressed air system to blow air when the rod-shaped article is located in the seat of the first plurality and to push it inside the first coil of the first drum;

a second drum including a second plurality of seats, each seat of the second plurality adapted to receive a rod-shaped article;

a second inductive sensor positioned at a seat of the second plurality, the second inductive sensor including a second coil defining an inner volume large enough to receive therein a second end of the rod-shaped article, the second inductive sensor being adapted to sense a characteristic of a second susceptor in the rod-shaped article;

a second compressed air system aligned with the seat of the second plurality;

a second actuator adapted to activate the second compressed air system to blow air when the rod-shaped article is located in the seat of the second plurality and to push it inside the second coil of the second drum;

the first drum and the second drum being substantially tangent so as to allow a transfer of the rod-shaped article from the first drum to the second drum.

Example Ex30: An equipment for the manufacturing of aerosol generating articles comprising a rod-shaped element including a susceptor, said equipment comprising an inspection device according to any of Ex1-Ex29.

Example Ex31: The equipment according to Ex30, wherein the rod-shaped element includes aerosol forming material.

Example Ex32: A method to inspect rod-shaped articles, comprising:

providing an inspection device according to Ex1-Ex10;

positioning the rod-shaped article in the seat of the drum wherein the first semi-coil and the second semi-coil are in the second operative position;

moving the first semi-coil and the second semi-coil in the first operative position;

sensing a characteristic of the susceptor.

Example Ex33: A method to inspect rod-shaped articles, comprising:

providing an inspection device according to Ex11-Ex22;

positioning the rod-shaped article in the seat of the drum;

pushing the rod-shaped article in the coil by means of an air flow;

sensing a characteristic of the susceptor.

Examples will now be further described with reference to the figures in which:

FIG. 1 is a schematic perspective view partially sectioned of a rod-shaped article including a susceptor to be inspected according to the invention;

FIG. 2 is a lateral view in section of the rod-shaped article of FIG. 1;

FIG. 10 is a third embodiment of an inspection device according to the invention;

FIGS. 11 and 12 are two enlarged view of two details of FIG. 10 in two different embodiments; and FIG. 13 and FIG. 14 are two sectional views of the coil of the first embodiment of the inspection device of FIG. 3 in a first and in a second operative position, respectively.

Figure 3:
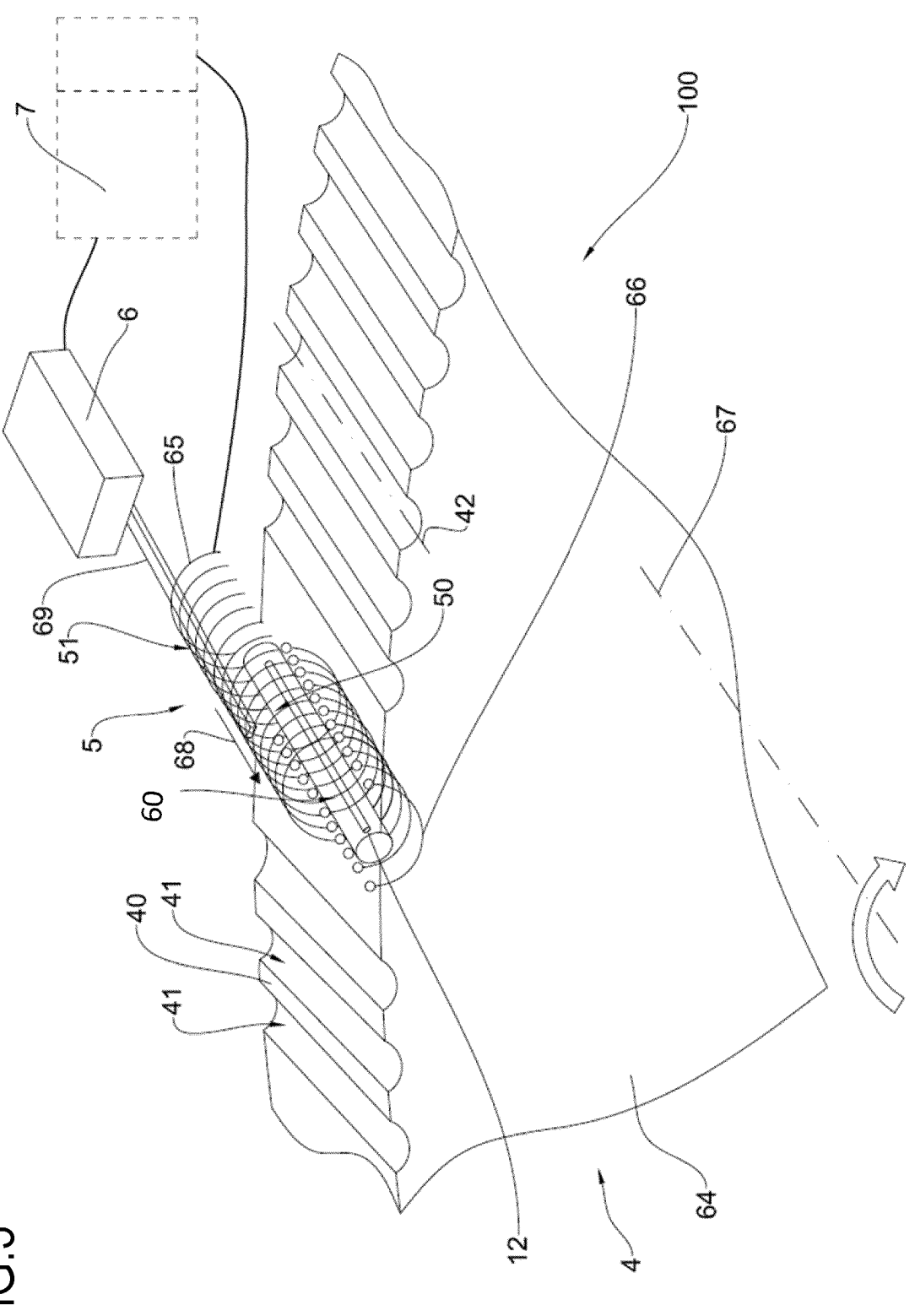
FIG. 3 is a schematic perspective view of an inspection device according to a first embodiment of the present invention in a first configuration.

With initial reference to FIGS. 1 and 2, an example of a rod-shaped article is globally indicated with 60.

Preferably, the rod-shaped article 60 comprises several components of an aerosol generating article, for example a complete aerosol generating article.

The aerosol-generating article 60 comprises for example a plurality of elements assembled in the form of a rod. The plurality of elements may comprise a plug element 11, an aerosol-forming substrate 10 in the form of a tobacco plug, a susceptor material 12 positioned within the aerosol-forming substrate 10, a hollow acetate tube 16, a further hollow acetate tube 18, a mouthpiece 2, and an outer wrapper 22. The aerosol-generating article 60 comprises a mouth end 24 and a distal end 26. The rod-shaped article 60 defines a longitudinal axis 61.

Preferably, the plurality of elements above listed develop along the longitudinal axis 61 of the rod-shaped article 60 one after the other. Preferably, they all have the same diameter.

Preferably, a cross section of the rod-shaped article 60 along a plane perpendicular to its longitudinal axis 61 is a circle.

The rod-shaped article 60 comprises an outer surface 13, preferably substantially cylindrical, which extends along the longitudinal axis 61. The longitudinal axis 61 of the rod-shaped article 60 may correspond to the axis of the cylinder.

The aerosol forming substrate 10 may include homogenized tobacco material.

The susceptor 12 is preferably in thermal contact with the aerosol forming substrate 10 such that, when the susceptor is inductively heated, heat is transferred to the aerosol forming substrate 10 and aerosol is thereby released. Preferably, the susceptor 12 is completely surrounded by the tobacco material forming the aerosol forming substrate 10.

As shown in the example of FIGS. 1 and 2, the susceptor 12 is completely contained in the rod-shaped article 60, more preferably it is completely contained in the aerosol forming substrate 10.

The susceptor 12 is realized in a conductive material. Preferably, the susceptor is realized in metal and, in some embodiments, it is realized in ferromagnetic material.

According to preferred embodiments, as in FIGS. 1 and 2, the susceptor 12 has the shape of a strip. Alternatively, it may have the shape of a rod. Preferably, its thickness is comprised between micrometers and 60 micrometers. Preferably, the length of the susceptor is comprised between millimetres and 20 millimetres.

FIG. 3 shows a portion of a preferred embodiment of a drum 4 of an inspection device 100 according to a first aspect of the present invention.

For the sake of clarity, the inspection device 100 is only partially shown in FIG. 3.

As it will be apparent from the following description, the inspection device 100 is adapted to control the quality of rod-shaped articles 60, and in particular of the susceptor 12.

Quality control provided by inspection device 100 may entail checking either the presence, integrity or precise position of the susceptor 12, as well as further characteristics of the latter.

By way of non-limiting example, such characteristics may include on ore more of the following: length of the susceptor, thickness of the susceptor, deviation of the susceptor from a rectilinear development, deviation of the susceptor's axis from parallelism with the longitudinal axis 61 of the rod-shaped article 60, electromagnetic properties of the susceptor.

Also, the quality control may take place at any stage of the manufacturing process of the aerosol generating article. This means that the rod-shaped article 60 could be checked when the aerosol forming substrate 10 is joined to the mouth piece filter element 2, or to any other component to be fixed thereto, or the aerosol forming substrate 10 including the susceptor 12 can be checked on its own.

With again reference to FIG. 3, the drum 4 comprises a plurality of seats 41 each of them being adapted to receive a rod-shaped article 60. The seats 41 are preferably located on an outer surface 40 of the drum 4. Preferably, there are between about 20 and 60 seats 41 in the drum 4, preferably about 40.

In some embodiments, the drum 4 is cylindrical shaped and, preferably, the outer surface 40 onto which the seats 41 are located corresponds to the lateral surface of the cylinder.

It will be appreciated that the seats 41 are preferably dimensioned and shaped in order to receive, at least partially, the rod-shaped article 60. Preferably, the dimensions and shapes of the seats 41 are selected so as to either receive the rod-shaped article 60. More in general, quality control preferably includes positioning the rod-shaped article 60 in one of the seats 41.

Positioning of the rod-shaped article 60 may occur either by using a suitable positioning device, not shown in the drawings, or by transferring the rod-shaped article 60 in any other possible manner, for example from another drum or conveyor.

In some embodiments, the inspection device 100 may be included in an apparatus for manufacturing aerosol generating articles and the rod-shaped article 60 may be transferred to the inspection device 100 from a conveyor element of the apparatus.

Preferably, drum 4 is a rotating drum having a rotational axis 67. Accordingly, the drum 4 allows to transfer the rod-shaped article 60 from a first position to a second position, preferably forming an entry where it is positioned on the seat and an exit positon where it is removed from the seat. The first position and the second position (not depicted in the drawing 3) are separated by an angular rotation of the drum.

In some embodiments, the seats 41 may be oblong shaped, so as to define a respective seat axis 42. Preferably, the the the seat axis 42 of the seat 41 and the rotational axis 67 are parallel to each other. Preferably all axes 42 of the plurality of seats 41 are parallel to each other.

The seats 41 are preferably formed on an outer surface 40 of the drum 4. The seats 41 may be in the form of recesses realized on the outer surface 40 of the drum 4.

Nevertheless, it is well evident that seats 41 may be defined by other elements on the outer surface of the drum 4, for example fixed thereto and radially projecting therefrom.

Preferably, the drum 4 defines a front face 64 and a rear face (not visible in the figures). The rear face is axially opposite to the front face 64.

In some embodiments, the seats 41 extends from the front face 64 to the rear face, that is the seats may be provided with opposed open ends.

In this manner, the rod-shaped article 60 may be received in the seat 41 by approaching it laterally, preferably by sliding along the direction define by the seat axis 42.

As shown in the embodiment of FIG. 3, the seats 41 may have a length at least equal to the length of the rod-shaped article 60 to be checked. Longer seats 41, allowing sliding of the rod-shaped article 60 therein may be used as well.

In some embodiments, the rotational axis 67 of the drum 4 is substantially horizontal.

The seats 41 may be configured such that the rod-shaped article 60 is discharged from the seat 41, when it reaches a specific angular position along rotational axis 67 in which gravity acts on the rod-shaped articles 60 in order to release it from the drum 4.

The inspection device 100 further comprises an inductive sensor 5 positioned at least at one of the plurality of seats 41. It will be appreciated that although the embodiment of FIG. 3 represents a single inductive sensor 5 positioned at a specific seat 41, each seat 41 of the drum 4 may comprise a respective inductive sensor 5.

Also, according to further possible embodiments, inductive sensors 5 may be provided at selected seats 41, for example at predetermined angular distance.

Preferably, the inductive sensor 5 includes a coil 51 defining an inner volume 50 large enough to receive therein at least an end of the rod-shaped article 60.

Figures 7, 8, 9:
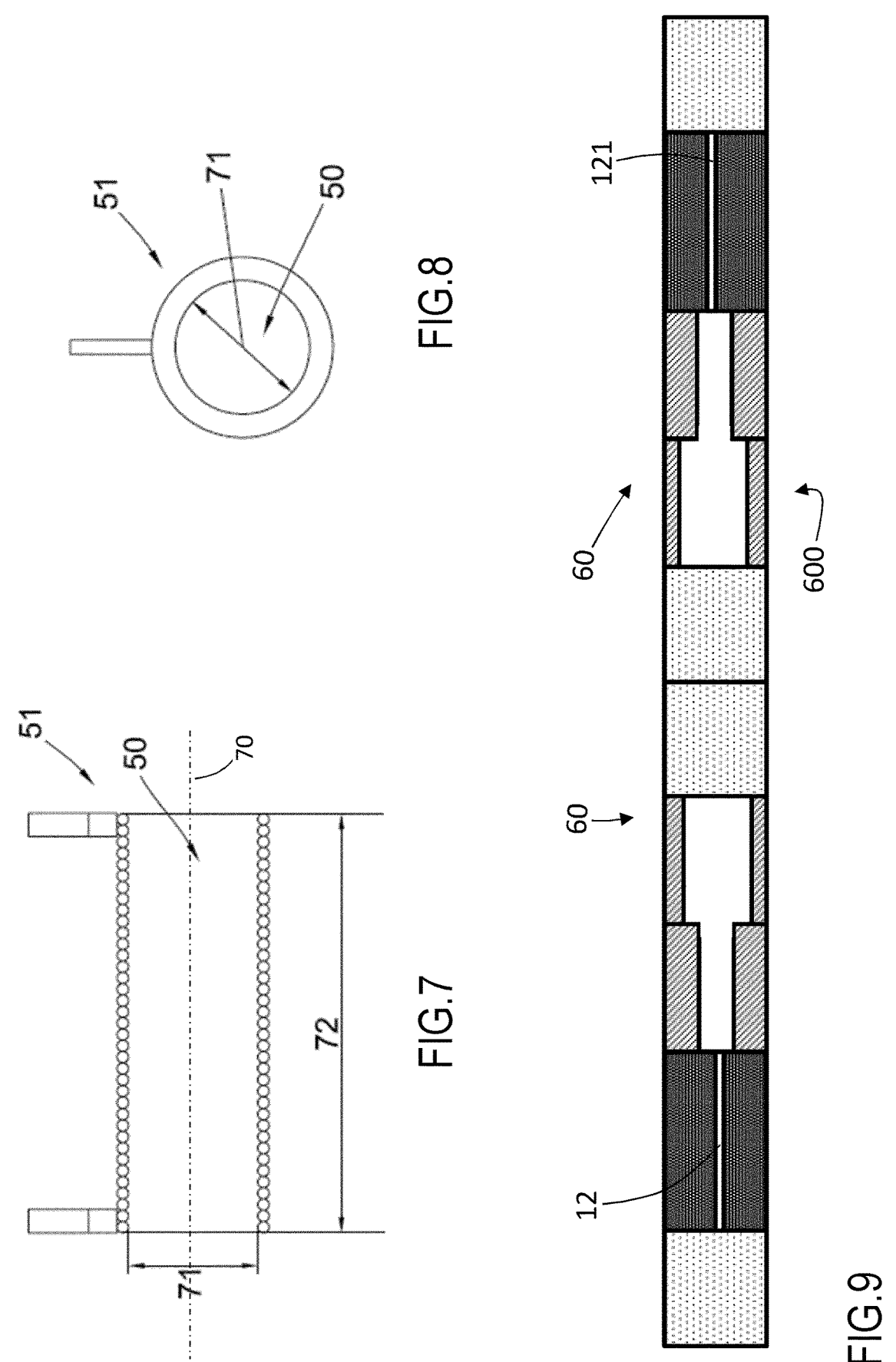
FIG. 7 is a detailed view in section of a coil of the inspection device of FIG. 3, 4 or 5.
FIG. 8 is a front view of the coil of FIG. 7.
FIG. 9 is a lateral view of another embodiment of the rod-shaped article to be inspected according to the invention.

FIGS. 7 and 8 shows the coil 51 according to a preferred embodiment.

Preferably, the coil 51 defines a coil axis 70 and has an internal diameter 71 comprised between 10 millimetres and 18 millimetres and, more preferably, comprised between 12 millimetres and 16 millimetres. Preferably, the internal diameter 71 of the coil 51 is 14 millimetres.

It will be appreciated that the above diameters are selected in order to make the coil 51 wide enough to receive therein the mouth end 24 or the distal end 26 of the rod-shaped article 60 but, at the same time, to avoid bulky elements to be used in the inspection device 100.

In some embodiments, the length of the coil 51 is adapted to wholly house therein the rod-shaped article 60.

Preferably, the length 72 of the coil is comprised between 20 millimetres and 40 millimetres, more preferably, comprised between 25 millimetres and 35 millimetres. Preferably, the length 72 of the coil 51 is 32 millimetres.

In some embodiments, the coil 51 is formed by a pair of parallel wounded-up wires.

Preferably, the coil 51 comprises a number of total turns comprised between 26 and 46. More preferably, the number of turns is comprised between 30 and 42. Preferably, the number of turns is 32.

In case the coil 51 is formed by a pair of wires, each wire may comprise half of the total number of turns mentioned above.

The coil 51 is preferably cylindrically shaped. Preferably, the coil 51 is positioned at the seat so that the coil axis 70 is parallel to the seat axis 42.

The presence of the susceptor 12 in the rod-shaped article 60 may be sensed by moving the rod-shaped article 60 relative to coil 51 and by considering a variation in a feedback signal generated by the interaction between the susceptor 12 and the coil 51.

To this end, in some embodiments as in FIG. 3, the inspection device 100 comprises a control unit 7 electrically connected to the inductive sensor 5 and adapted to receive the signal from the inductive sensor 5 and to compare it with a threshold in order to detect the variation of the signal generated by the presence of the susceptor 12.

Figure 4:
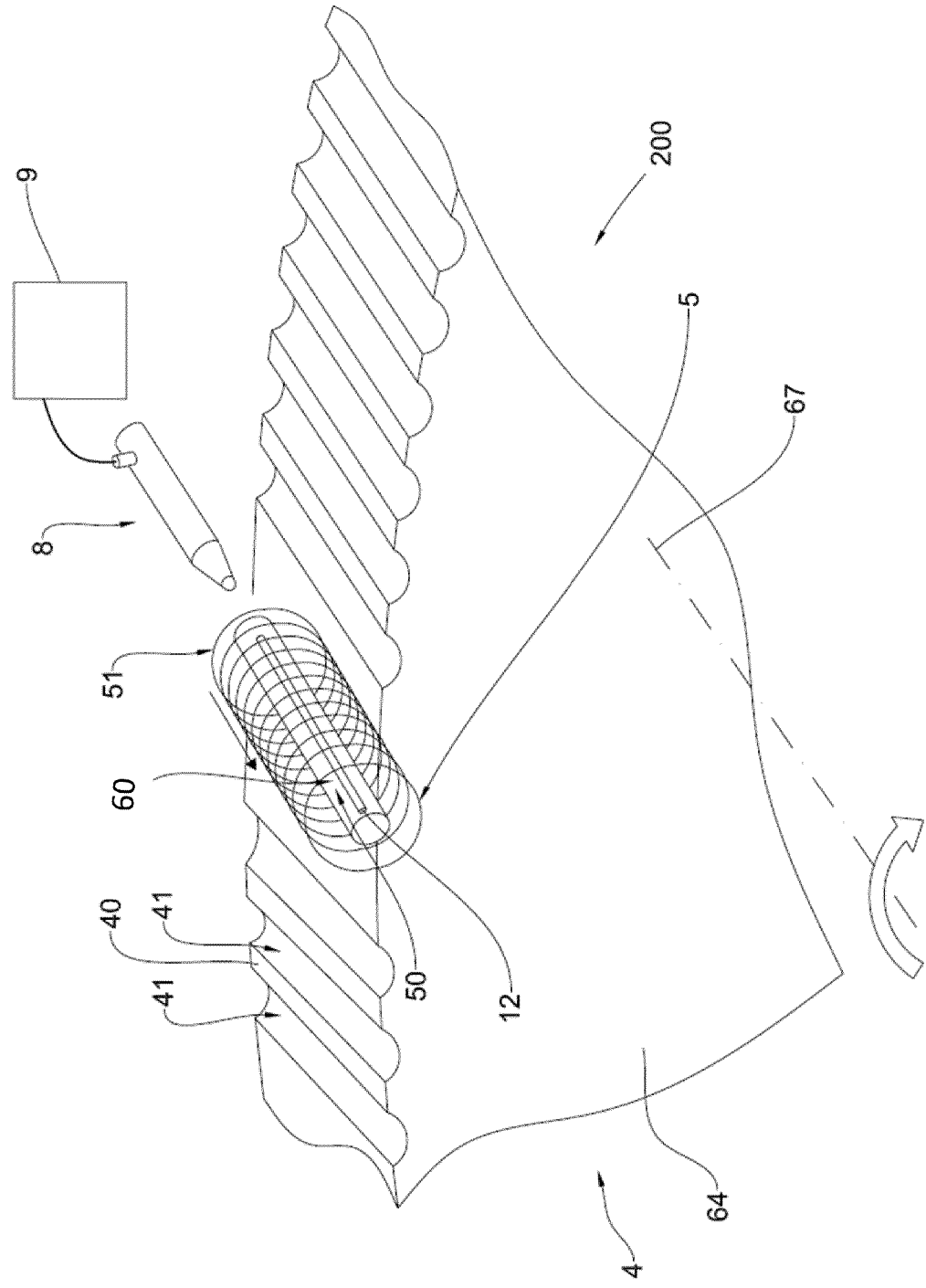
FIG. 4 is a schematic perspective view of an inspection device according to a second embodiment of the present invention.
Figure 5:
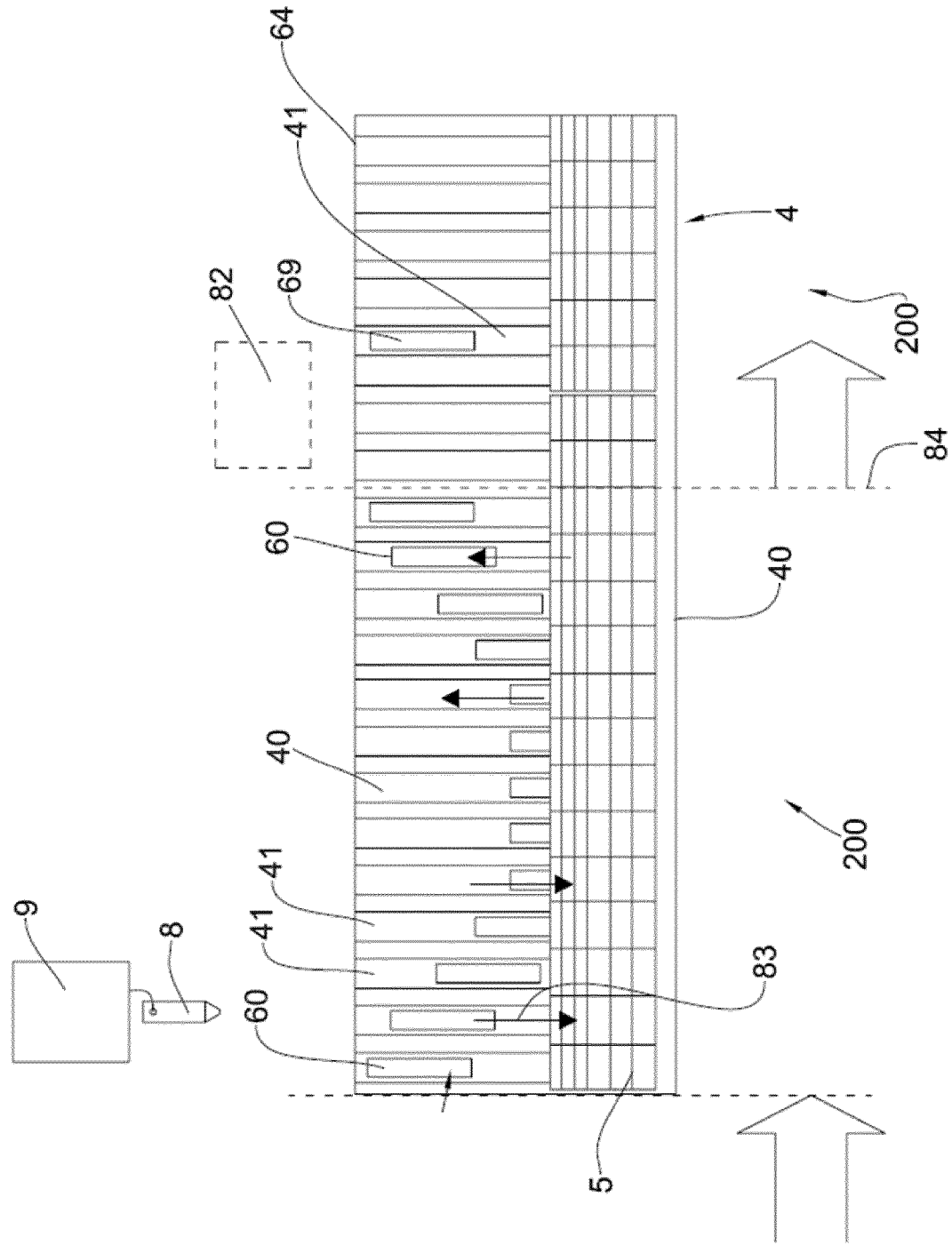
FIG. 5 is a schematic top view of the inspection device of FIG. 4 in a time sequence.

It will be appreciated that such variation of the signal may be caused either by moving the coil 51 with respect to the rod-shaped article 60, as in the example of FIG. 3, or by moving the rod-shaped article 60 with respect to the coil 51 as in the embodiment of FIG. 4 or FIG. 5.

In general, it will be appreciated that the inductive sensor 5 may generate an alternative magnetic field in the coil 51 which is altered when passed through by the susceptor 12. More in general, the inductive sensor 5 is configured to generate an alternative magnetic signal in a detection direction, preferably corresponding to the axis 70 of the coil 51.

Preferably, the magnetic field generated by the inductive sensor 5 is altered when a first end 24, 26 of the rod-shaped article 60 in which the susceptor 12 is supposed to be located is received in the inner volume 50 of the coil 51 of the inductive sensor 5.

In other words, the magnetic field generated by the passage of the susceptor 12 through the inner volume 50 of the inductive sensor 5 acts against the magnetic field generated by sensor 5, that is, by the coil 51. According to the Lenz law the susceptor 12 acts as a resistance in the coil 51 or more in general in the inductive sensor 5.

In further detail, when a ferromagnetic material enters the field, an electromagnetic force is induced in it (Maxell-Faraday law) which creates alternative Eddy currents. This alternative current generates an induced magnetic field (Maxell-Ampère law), which is in opposition to the sensor magnetic field (Lenz law).

Presence or absence of the susceptor 12 in the rod-shaped article 60 may be accordingly determined in view of such expected behaviour in the magnetic field. If no alternation occurs when a rod-shaped article 60 passes through the alternative magnetic field generated by the coil 51, then no susceptor 12 is likely to be present in the rod-shaped article 60.

By contrast, alternation may be determined by calculating the impedance of the rod-shaped article 60, that varies as the susceptor 12 passes through the inner volume 50 of coil 51, as previously explained.

According to preferred embodiments, the feedback signal generated as the susceptor 12 passes through the inner volume 50 can be used for determining other characteristics of the susceptor 12.

Figure 6:
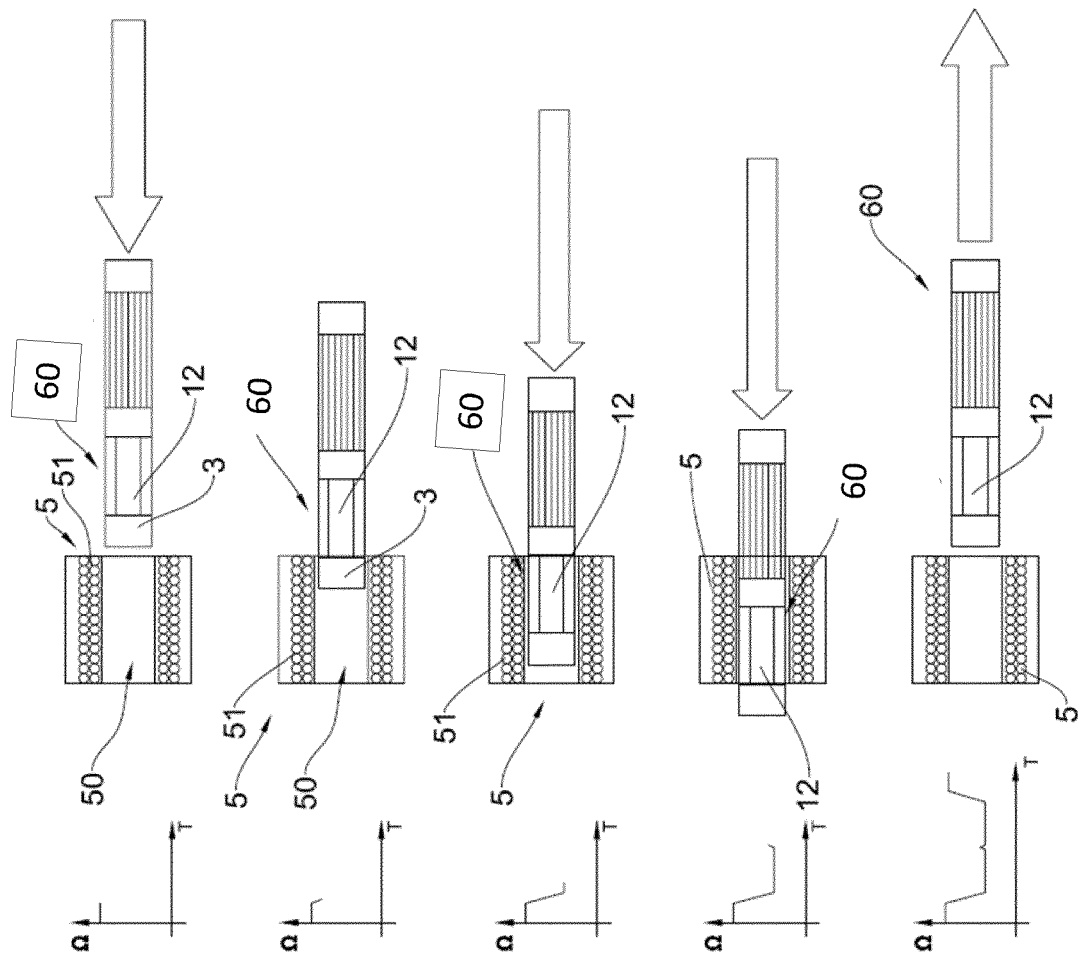
FIG. 6 is a sequence of steps of the functioning of the inductive sensor present in the inspection device of the invention.

With reference to FIG. 6, a possible use of the feedback signal may be directed to determine the length of the susceptor 12.

FIG. 6 shows how the equivalent resistance of the system "coil and susceptor" varies according to the relative position of the susceptor 12 in the inner volume 50.

Initially, when the rod-shaped article 60 has not entered the inner volume 50 the feedback signal outputted by the inductive sensor 5 is not altered.

As the rod-shaped article 60 enters the inner volume 50, a variation in the feedback signal occurs.

The feedback signal will reach a minimum level when the whole susceptor 12 has fully entered the inside volume 50, and will begin to decrease as soon as the end of the susceptor 12 will go out of the coil 51.

By comparing this signal to the positions of the rod-shaped article 60 inside the inner volume 50, it is possible to determine the length of the susceptor 12.

Preferably, the susceptor 12 length is estimated according to a peak of a measure equivalent resistance, determined after a suitable calibration.

Alternatively, the parameter function of the impedance shows a maximum, and not a minimum, when the susceptor is fully inserted in the coil.

In such embodiments, the coil 51, or more in general the inner volume 50 of the induction sensor 5, is longer than the expected length of the susceptor 12, also according to the previously mentioned characteristics of the coil.

Preferably, the length of coil 51 is selected so as to be longer than the expected length of the susceptor 12 of at least 10 millimetres per side, to avoid magnetic field distortions at the end of the coil.

According to preferred embodiments, the control unit 7 is configured to determine if the length of the susceptor 12 corresponds to an expected value, by checking the variation of the feedback signal according to the position of the rod-shaped article 60 in the inner volume 50.

It will be appreciated that the control unit 7 may be adapted to calculate the length of the susceptor 12 located in the rod-shaped article 60 also according to different methods, for example taking in general into account other specific behaviour of the inductive sensor 5 during interaction of the rod-shaped article 1 with the inner volume 50.

More in general, the equivalent resistance of the feedback signal may be indicative of the nature or consistency of shape or composition of the susceptor 12. Accordingly, further characteristic of the susceptor 12 may be determined by the inspection device 100 of the invention.

In order to introduce the rod-shaped article 60 in the coil 51, in the inspection device 100 of FIG. 3, the coil 51 is divided in two semi-coils 65 and 66. The first semi-coil 66 is positioned below the outer surface 40 of the drum 4, while the first semi-coil is positioned above the outer surface 40 of the drum. The two semi-coils 65, 66 can move from a first operative position shown in FIG. 13, in which they form the coil 51. In this first operative position, the measurements described above by the inductive sensor and shown for example in FIG. 6 can be performed. The second operative position depicted in FIGS. 3 and 13, the second semi-coil 65 is moved along the coil axis 70 and distanced from the first semi-coil, so that a rod-shaped article 60 can be located in the seat 41. The movement is performed by means of an actuator 6 connected to the control unit 7.

In the inspection device 100 of FIGS. 3, 13, and 14, during operation, the rod-shaped articles 60 are inserted in seats 41. When the rod-shaped articles are positioned in the seats, the first semi-coil 66 and the second semi-coil 65 are in the second operative position, that is, the two semi-coils 66 are separated from each other, as in FIGS. 3 and 14. As soon as the rod-shaped article 60 is in the seat, the first semi-coil 66 and second semi-coil 65 are moved to the first operative position of FIG. 13 so that the measurement with the inductive sensor 5 can take place. The relative movement of the first semi-coil and the second semi-coil is as follow: the first semi-coil 66 is positioned below the outer surface 40 and it is fixed with respect to the same, while the second semi-coil 65 translates back and forth from the first operative position of FIG. 14 to the second operative position of FIGS. 3 and 14, and vice-versa. The shifting of the second semi-coil 65 from the first operative position to the second operative position and vice-versa is obtained by means of a piston 69 connected to the actuator 6. The piston 69 is attached to the second semi-coil to move it linearly towards and away the first semi-coil, as shown by arrow 68 of FIG. 3

In a different embodiment of the invention, which is depicted in FIGS. 4 and 5, instead of a movement of the coil with respect to the rod-shaped article as in the embodiment of FIGS. 3, 13 and 14, a movement of the rod-shaped article 60 with respect to the coil 51 takes place. In the inspection device 200, identical reference numbers as in inspection device 100 are used to identify the same elements. In the inspection device 200, the inductive sensor 5 includes coil 51 which is in this case attached to the outer surface 40 of the drum 4. The coil 51 (better seen in FIGS. 7 and 8) is for example located at one end of the seat 41. The inspection device 200 includes a compressed air system 8, 9 including a compressed air generator 9 and a gun 8 to eject a flow of compressed air. The gun may eject a flow of compressed air in a direction substantially parallel to the seat axis 42 and thus parallel to the longitudinal axis of the rod-shaped article 60. The gun may be located at one side of the drum 4 and may be stationary, that is, it does not rotate with the drum. In this way, a single compressed air system may be used for all seats 41. During rotation, when a rod-shaped article passes in front of gun 8, a flow of compressed air is ejected, which pushes the rod-shaped article 60 inside the coil 51 and the measurement above described can take place, using inductive sensor 5. This is shown in FIG. 5 where a series of "screenshots" taken at consecutive time intervals is depicted. In the far left of the figure, a rod-shaped article 60 is inserted in the seat 41. In the subsequent rotation, the seat with the rod-shaped article 60 passes in front of gun 8 and a flow of compressed air is ejected along direction 83 by gun 8. The rod-shaped article 60 is then pushed inside coil 51 (see the following snapshots from left to right of the figure, till dotted line 64).

Dotted line 84 separates FIG. 5 in two. The second part on the right of dotted line 84 of FIG. 5 is taken several time intervals later than the left part (see details below).

The inspection device 100, 200 of the present invention may also comprise a rejection device (schematically depicted in the right part of FIG. 5 as a rectangle 82), adapted to reject rod-shaped articles 60 that has no susceptor 12 therein, or has a susceptor 12 which is not complaint with expected characteristics. As previously explained, the rod-shaped articles 60 may be advantageously rejected on the basis of the signal emitted by the induction sensor 5, according to calculation or determination made by the control unit 7. As shown in the right portion of FIG. 5, for example, the effect of the rejection device 82 is to keep the rod-shaped article 60 which are defective in the drum 4, while the valid rod-shaped articles 60 are transferred to other drums (not shown) to continue processing.

Rod shaped articles 600 may include also a first susceptor 12 and a second susceptor 121, as depicted in FIG. 9. Rod-shaped articles 600 substantially include two rod-shaped articles 60 according to the embodiment of FIGS. 1 and 2.

In case a rod-shaped article 600 includes more than one susceptor, an inspection device according to a third embodiment is preferably provided, as inspection device 300 of FIG. 10.

The inspection device 300 includes two or more checking drums 4, at least a first drum and a second drum, each of which includes a coil 51. The first drum or the second drum are identical to drum 4, which can be according either to the first embodiment of FIGS. 3 and 13-14 or to the second embodiment of FIG. 4 or 5. The drums however are preferably of the same type, that is, either according to the first embodiment of inspection device 100, or according to the second embodiment of inspection device 200.

The first drum 4 is adapted to check the first susceptor 12 of the rod-shaped article 600, while the second drum 4 is adapted to check the second susceptor 121 of the rod-shaped article 600. For example, if the first drum and second drum are according to the second embodiment of FIGS. 4 and 5, in the first drum the compressed air system is located at the first side surface of the first drum, and in the second drum the compressed air system is located at the second side surface of the second drum.

From the first drum, after the inspection of the first susceptor 12, the rod-shaped article 600 is transferred to the second drum, as depicted in FIGS. 11 and 12. The first drum and second drum are substantially tangent to each other. The gap between the first drum and second drum is such that a rod-shaped article 600 can be inserted therebetween. The transfer takes place between a seat of the first drum and a seat of the second drum.

In FIG. 11, the transfer is shown between two drums 4 according to the first embodiment of FIGS. 3, 13, 14. In FIG. 12, the transfer is shown between two drums 4 according to the second embodiment of FIGS. 4, 5.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±10 percent of A. Within this context, a number A may be considered to include numerical values that are within general standard error for the measurement of the property that the number A represents. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An inspection device for the quality control of rod-shaped articles, the device comprising:
    a drum defining an outer surface and including a plurality of seats, each seat of the plurality adapted to receive a rod-shaped article;
    an inductive sensor located at a seat of the plurality, the inductive sensor including a coil defining an inner volume large enough to receive therein an end of the rod-shaped article, the inductive sensor being adapted to sense a characteristic of a susceptor in the rod-shaped article;
    wherein the coil includes a first semi-coil and a second semi-coil, the first semi-coil and the second semi-coil being movable from a first operative position where the first semi-coil and the second semi-coil are in contact to each other forming the coil where current can flow to a second operative position where the first semi-coil and the second semi-coil are separated from each other, and vice-versa;
    the first semi-coil being located below the outer surface of the drum and the second semi-coil being located above the outer surface of the drum; and
    an actuator adapted to move the first semi-coil and the second semi-coil from the first operative position to the second operative position and vice-versa.

2. The inspection device according to claim 1, including a control unit adapted to command the actuator to move the first semi-coil or the second semi-coil from the second operative position to the first operative position when a rod-shaped article is on the seat.

3. The inspection device according to claim 1- or 2, wherein the seat includes a receiving surface, part of the outer surface of the drum, and wherein the first semi-coil is located below the receiving surface of the seat.

4. An inspection device for the quality control of rod-shaped articles, the device comprising:

a drum including a plurality of seats, each seat of the plurality adapted to receive a rod-shaped article;

an inductive sensor located at a seat of the plurality, the inductive sensor including a coil defining an inner volume large enough to receive therein an end of the rod-shaped article, the inductive sensor being adapted to sense a characteristic of a susceptor in the rod-shaped article;

a compressed air system aligned with the seat of the plurality;

an actuator adapted to activate the compressed air system to blow air when the rod-shaped article is located in the seat to push the rod-shaped article inside the coil.

5. The inspection device according to claim 1, wherein the drum has a rotational axis and each seat of the plurality defines a longitudinal axis, the longitudinal axis and the rotational axis being parallel to each other.

6. The inspection device according to claim 1, wherein the length of the coil is comprised between 20 millimeters and 40 millimeters.

7. The inspection device according to claim 1, comprising a control unit electrically connected to the inductive sensor, the control unit being adapted to receive a signal from the inductive sensor and to compare the signal with a threshold.

8. The inspection device according to claim 7, wherein the control unit is adapted to calculate a length of a susceptor located in the rod-shaped article.

9. The inspection device according to claim 1, comprising a rejection device, adapted to reject rod-shaped articles on the basis of a signal emitted by the inductive sensor.

10. The inspection device according to claim 1, wherein the drum comprises a plurality of inductive sensors, a sensor for each seat of the plurality of seats.

11. The inspection device according to claim 1, wherein the seat defines a seat axis and the coil defines a coil axis, and wherein the coil axis and the seat axis are parallel to each other.

12. An inspection device comprising:

a first drum defining a first outer surface and including a first plurality of seats, each seat of the first plurality adapted to receive a rod-shaped article;

a first inductive sensor positioned at a seat of the first plurality, the first inductive sensor including a first coil defining an inner volume large enough to receive therein a first end of the rod-shaped article, the first inductive sensor being adapted to sense a characteristic of a first susceptor in the rod-shaped article;

wherein the first coil includes a first semi-coil and a second semi-coil, the first semi-coil and the second semi-coil being movable from a first operative position where the first semi-coil and the second semi-coil are in contact to each other forming the first coil where current can flow to a second operative position where the first semi-coil and the second semi-coil are separated from each other, and vice-versa;

the first semi-coil being located below the first outer surface of the first drum and the second semi-coil being located above the first outer surface of the first drum;

a first actuator adapted to move the first semi-coil and the second semi-coil of the first coil from the first operative position to the second operative position and vice-versa in the first drum;

a second drum defining a second outer surface and including a second plurality of seats, each seat of the second plurality being adapted to receive a rod-shaped article;

a second inductive sensor located at a seat of the second plurality, the second inductive sensor including a second coil defining an inner volume large enough to receive therein a second end of the rod-shaped article, the second inductive sensor being adapted to sense a characteristic of a second susceptor in the rod-shaped article;

wherein the second coil includes a first semi-coil and a second semi-coil, the first semi-coil and the second semi-coil being movable from a first operative position where the first semi-coil and the second semi-coil are in contact to each other forming the second coil where current can flow to a second operative position where the first semi-coil and the second semi-coil are separated from each other, and vice-versa;

the first semi-coil of the second coil being located below the second outer surface and the second semi-coil of the second coil being located above the second outer surface;

a second actuator adapted to move the first semi-coil and the second semi-coil of the second coil from the first operative position to the second operative position and vice-versa in the second drum;

the first drum and the second drum being substantially tangent so as to allow a transfer of the rod-shaped article from the first drum to the second drum.

13. An inspection device comprising:

a first drum including a first plurality of seats, each seat of the first plurality adapted to receive a rod-shaped article;

a first inductive sensor located at a seat of the first plurality, the first inductive sensor including a first coil defining an inner volume large enough to receive therein a first end of the rod-shaped article, the first inductive sensor being adapted to sense a characteristic of a first susceptor in the rod-shaped article;

a first compressed air system aligned with the seat of the first plurality;

a first actuator adapted to activate the first compressed air system to blow air when the rod-shaped article is located in the seat of the first plurality to push the rod-shaped article inside the first coil;

a second drum including a second plurality of seats, each seat of the second plurality adapted to receive a rod-shaped article;

a second inductive sensor positioned at a seat of the second plurality, the second inductive sensor including a second coil defining an inner volume large enough to receive therein a second end of the rod-shaped article, the second inductive sensor being adapted to sense a characteristic of a second susceptor in the rod-shaped article;

a second compressed air system aligned with the seat of the second plurality;

a second actuator adapted to activate the second compressed air system to blow air when the rod-shaped article is located in the seat of the second plurality to push the rod-shaped article inside the second coil of the second drum;

the first drum and the second drum being substantially tangent so as to allow a transfer of the rod-shaped article from the first drum to the second drum.

14. A method to inspect rod-shaped articles, comprising: providing an inspection device according to claim 1; positioning the rod-shaped article in the seat of the drum wherein the first semi-coil and the second semi-coil are in the second operative position; moving the first semi-coil and the second semi-coil in the first operative position; and sensing a characteristic of the susceptor.

15. A method to inspect rod-shaped articles, comprising: providing an inspection device according to claim 2; positioning the rod-shaped article in the seat of the drum; pushing the rod-shaped article in the coil by means of an air flow; and sensing a characteristic of the susceptor.

16. The inspection device according to claim 4, wherein the drum has a rotational axis and each seat of the plurality defines a longitudinal axis, the longitudinal axis and the rotational axis being parallel to each other.

17. The inspection device according to claim 4, wherein the length of the coil is comprised between 20 millimeters and 40 millimeters.

18. The inspection device according to claim 4, comprising a control unit electrically connected to the inductive sensor, the control unit being adapted to receive a signal from the inductive sensor and to compare the signal with a threshold.

19. The inspection device according to claim 18, wherein the control unit is adapted to calculate a length of a susceptor located in the rod-shaped article.

20. The inspection device according to claim 4, comprising a rejection device, adapted to reject rod-shaped articles on the basis of a signal emitted by the inductive sensor.

* * * * *